US012704750B2

(12) United States Patent
Shirai et al.

(10) Patent No.: US 12,704,750 B2
(45) Date of Patent: Aug. 11, 2026

(54) DISPLAY DEVICE

(71) Applicant: SONY SEMICONDUCTOR SOLUTIONS CORPORATION, Kanagawa (JP)

(72) Inventors: Kiyotoshi Shirai, Kanagawa (JP); Toshihiko Orii, Kanagawa (JP); Hiroshi Nakao, Kanagawa (JP); Yasuhiro Watanabe, Kanagawa (JP); Takaaki Miyatake, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 15 days.

(21) Appl. No.: 18/851,976

(22) PCT Filed: Apr. 17, 2023

(86) PCT No.: PCT/JP2023/015362
§ 371 (c)(1),
(2) Date: Sep. 27, 2024

(87) PCT Pub. No.: WO2023/210430
PCT Pub. Date: Nov. 2, 2023

(65) Prior Publication Data

US 2025/0199348 A1 Jun. 19, 2025

(30) Foreign Application Priority Data

Apr. 25, 2022 (JP) ................................ 2022-071915

(51) Int. Cl.
*G02F 1/133* (2006.01)
*G02F 1/1362* (2006.01)
(Continued)

(52) U.S. Cl.
CPC .... *G02F 1/13306* (2013.01); *G02F 1/136213* (2013.01); *G02F 1/1368* (2013.01); *G03B 21/006* (2013.01)

(58) Field of Classification Search
CPC ........... G02F 1/13306; G02F 1/136213; G02F 1/1368; G03B 21/006
See application file for complete search history.

(56) References Cited

U.S. PATENT DOCUMENTS

2002/0067328 A1* 6/2002 Yumoto .............. G09G 3/3685 345/92
2003/0122756 A1 7/2003 Kim et al.
(Continued)

FOREIGN PATENT DOCUMENTS

JP H10-105113 4/1998
JP H11-242207 9/1999
(Continued)

OTHER PUBLICATIONS

English Translation of International Search Report prepared by the Japan Patent Office on Jun. 7, 2023, for International Application No. PCT/JP2023/015362, 3 pgs.

*Primary Examiner* — Anne M Hines
(74) *Attorney, Agent, or Firm* — SHERIDAN ROSS P.C.

(57) ABSTRACT

A display device capable of achieving miniaturization, lower power consumption, and higher image quality is provided. A display device includes a plurality of pixels. The pixels each include a display element and a pixel circuit that controls a voltage supplied to the display element. The pixel circuit includes a capacitor that holds a charge according to the voltage supplied to the display element, a charge/discharge circuit that charges and discharges the capacitor, and a control circuit that controls the charge/discharge circuit. The charge/discharge circuit includes a first switching element that controls charging of the capacitor and a second switch-
(Continued)

10 : DISPLAY SYSTEM ing element that controls discharging of the capacitor. The control circuit includes a third switching element that controls on or off of at least one of the first switching element and the second switching element on a basis of at least one of pixel data or a display timing signal.

20 Claims, 13 Drawing Sheets

(51) Int. Cl.

| | |
|---|---|
| ***G02F 1/1368*** | (2006.01) |
| *G03B 21/00* | (2006.01) |

(56) References Cited

U.S. PATENT DOCUMENTS

| | | | |
|---|---|---|---|
| 2013/0076725 | A1 | 3/2013 | Tsukamoto et al. |
| 2016/0275840 | A1 | 9/2016 | Syu |
| 2017/0076672 | A1 | 3/2017 | Crounse et al. |
| 2017/0365228 | A1 | 12/2017 | Kwok et al. |

FOREIGN PATENT DOCUMENTS

| | | |
|---|---|---|
| JP | 2003-208144 | 7/2003 |
| JP | 2013-068836 | 4/2013 |
| JP | 2017-536577 | 12/2017 |
| JP | 2018-529126 | 10/2018 |

* cited by examiner

10 : DISPLAY SYSTEM

VERTICAL DRIVE CIRCUIT + LS
4,5
PCHG
27
/PCHG
n3
n2
n4
C3
Q7
Q8
n1
C1
C2
VH
Q1
Q2
Vss
31
23
HORIZONTAL DRIVE CIRCUIT
3
VDD
Q3
Q4
CTout
/GATE
Q6
Q5
32
L2
L3
DATA
VERTICAL DRIVE CIRCUIT + LS
4,5

HORIZONTAL DRIVE CIRCUIT
3
DATA
(VH AND VH-VDD AMPLITUDE)
L2
L1
L3
4,5
VERTICAL DRIVE CIRCUIT + LS
VH
Q23
Q24
CTout
Q25
VH-VDD
Q26
VH-VDD
32
23
31
Q21
VH
PCHG
VH-Vth AND VH AMPLITUDE
Q22
27
Cs
/GATE
Vss
Vss

DISPLAY DEVICE

CROSS REFERENCE TO RELATED APPLICATIONS

This application is a national stage application under 35 U.S.C. 371 and claims the benefit of PCT Application No. PCT/JP2023/015362, having an international filing date of 17 Apr. 2023, which designated the United States, which PCT application claimed the benefit of Japanese Patent Application No. 2022-071915, filed 25 Apr. 2022, the entire disclosures of each of which are incorporated herein by reference.

TECHNICAL FIELD

The present disclosure relates to a display device.

BACKGROUND ART

Display devices of a pulse-width modulation (PWM) type, which control a light emission period according to a gradation of each pixel, are known (see Patent Document 1). In Patent Document 1, a buffer between a selection circuit that selects data in a memory provided in a pixel circuit and a liquid crystal element is omitted to miniaturize the pixel circuit.

CITATION LIST

Patent Document

Patent Document 1: Japanese Patent Application Laid-Open No. 2013-68836

SUMMARY OF THE INVENTION

Problems to be Solved by the Invention

While a logic circuit that performs a logic operation of a digital signal operates with low power consumption of about 1 V, it is necessary to apply a voltage of 3 V or more to a liquid crystal element. For this reason, a pixel circuit is often achieved by a circuit having a voltage level corresponding to a drive voltage of a liquid crystal element. More specifically, transistors in a pixel circuit are medium-voltage or high-voltage transistors. Medium-voltage or high-voltage transistors have larger sizes and higher power consumption than low-voltage transistors used in a logic circuit.

Furthermore, as in Patent Document 1, because a memory having a static random access memory (SRAM) configuration is required in a pixel circuit in a display device of the pulse-width modulation type, circuit area of the pixel circuit increases, and power consumption also increases.

Because display devices of the pulse-width modulation type can be applied to various digital devices, further miniaturization, lower power consumption, and higher image quality are desired.

The present disclosure, therefore, provides a display device capable of achieving miniaturization, lower power consumption, and higher image quality.

Solutions to Problems

In order to solve the above problem, the present disclosure provides a display device including:

a plurality of pixels, in which the pixels each include a display element and a pixel circuit that controls a voltage supplied to the display element, the pixel circuit includes a capacitor that holds a charge according to the voltage supplied to the display element, a charge/discharge circuit that charges and discharges the capacitor, and a control circuit that controls the charge/discharge circuit, the charge/discharge circuit includes a first switching element that controls charging of the capacitor and a second switching element that controls discharging of the capacitor, and the control circuit includes a third switching element that controls on or off of at least one of the first switching element and the second switching element on the basis of at least one of pixel data or a display timing signal.

The first switching element and the second switching element may have a same withstand voltage and a same conductivity type.

The first switching element and the second switching element in the charge/discharge circuit may have a first withstand voltage, and the third switching element in the control circuit may have a second withstand voltage, which is lower than the first withstand voltage.

The first switching element, the second switching element, and the third switching element may be cascode-connected between a first reference voltage node and a second reference voltage node, and the capacitor may be connected between a connection node between the first switching element and the second switching element and the second reference voltage node.

The third switching element may have a same withstand voltage and a same conductivity type as the first switching element and the second switching element.

The third switching element may have a different withstand voltage from and a same conductivity type as those of the first switching element and the second switching element.

The first switching element and the second switching element may be cascode-connected between a first reference voltage node and a second reference voltage node, and the capacitor may be connected between a connection node between the first switching element and the second switching element and the second reference voltage node.

The control circuit may generate a control signal to be input to a gate of at least one of the first switching element and the second switching element on the basis of the pixel data and the display timing signal.

A precharge signal may be input to one of gates of the first switching element and the second switching element, and the control signal may be input to another gate.

A voltage amplitude of the precharge signal may be larger than a voltage amplitude of the control signal.

A voltage amplitude of the precharge signal may be larger than voltage amplitudes of the pixel data and the display timing signal.

The display device may further include a first drive circuit that sets a voltage level of the precharge signal in consideration of a threshold voltage of the first switching element or the second switching element.

The first switching element and the second switching element may be N-type metal oxide semiconductor (MOS) transistors, a drain of the first switching element may be connected to a first reference voltage node, one end of the capacitor may be connected to a source of the first switching element, and the first drive circuit may set the voltage level of the precharge signal to a voltage higher than a voltage of the first reference voltage node by the threshold voltage so that the source of the first switching element has a same voltage level as the first reference voltage node when the capacitor is charged.

The first switching element and the second switching element may be P-type metal oxide semiconductor (MOS) transistors, a source of the first switching element may be connected to a first reference voltage node, a drain of the second switching element may be connected to a second reference voltage node, one end of the capacitor may be connected to a drain of the first switching element, and the first drive circuit may set the voltage level of the precharge signal to a voltage lower than a voltage of the second reference voltage node by the threshold voltage so that the drain of the first switching element has a same voltage level as the second reference voltage node when the capacitor is discharged.

The first drive circuit may input the precharge signal having a voltage amplitude larger than a voltage amplitude of the control circuit and the display timing signal having a voltage amplitude close to the voltage amplitude of the control circuit to the control circuit.

The charge/discharge circuit may include a diode or a diode-connected transistor connected to the gate of the first switching element, and a compensation circuit that compensates for a decrease in a charging voltage of the capacitor caused in a case where the precharge signal is input to the gate of the first switching element via the diode or the diode-connected transistor.

A first reference voltage of a first reference voltage node and a second reference voltage of a second reference voltage node may have opposite voltage polarities, and a precharge signal supplied to a gate of the first switching element and the display timing signal may have opposite voltage polarities.

The precharge signal supplied to the gate of the first switching element and the pixel data may have opposite voltage polarities, and the control circuit may be supplied with the first reference voltage or the second reference voltage and an intermediate voltage between the first reference voltage and the second reference voltage.

The first switching element and the second switching element may have a same withstand voltage and different conductivity types.

MODE FOR CARRYING OUT THE INVENTION

An embodiment of a display device will be described hereinafter with reference to the drawings. Although main components of the display device will be mainly described below, the display device can have components and functions that are not illustrated or described. The following description does not exclude components and functions that are not illustrated or described.

Figure 1:
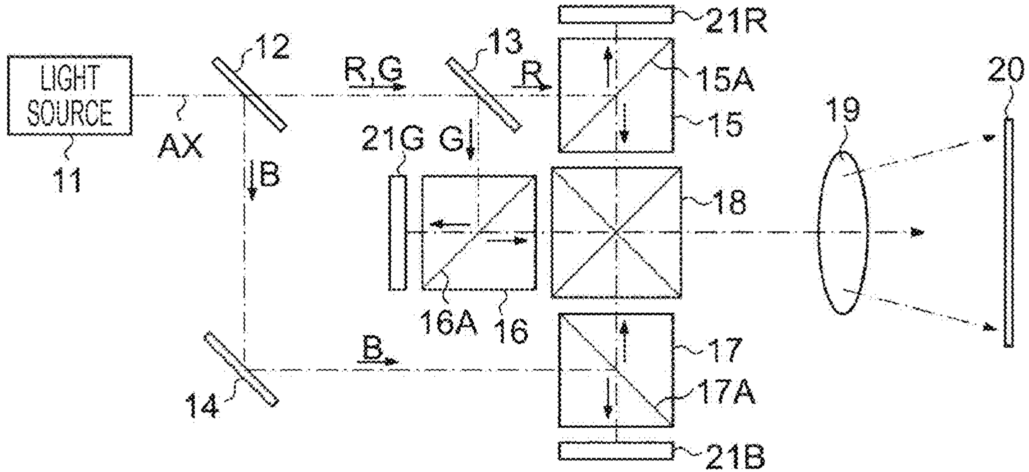
FIG. 1 is a diagram illustrating an example of an overall configuration of a display system including a display device according to an embodiment.

FIG. 1 is a diagram illustrating an example of an overall configuration of a display system 10 including display devices 1 according to an embodiment of the present technology. FIG. 1 illustrates an overall configuration of a display system 10 of a projection type. Note that the display devices 1 according to the present embodiment are not necessarily applied to the display system 10 of the projection type, and FIG. 1 is merely an example.

The display system 10 in FIG. 1 projects, for example, an image displayed on a screen of an information processing apparatus (not illustrated) onto a screen 20. The information processing apparatus is any electronic apparatus incorporating the display system 10, and is, for example, a projector, a digital camera, a smartphone, a tablet, a personal computer (PC), or the like.

The display system 10 is a reflective liquid crystal projector that uses reflective liquid crystal panels as light valves. The display system 10 is, for example, of a so-called three-plate type, in which a color image is displayed using three display devices 1 (also referred to as liquid crystal light valves) 21R, 21G, and 21B for colors of red, green, and blue, respectively. The display system 10 includes, for example, a light source 11, dichroic mirrors 12 and 13, and a total reflection mirror 14. The display system 10 further includes, for example, polarization beam splitters 15,16, and 17, a combining prism 18, and a projection lens 19.

The light source 11 emits white light including red light, blue light, and green light, which are required to display a color image, and may be, for example, a halogen lamp, a metal-halide lamp, a xenon lamp, or the like. The dichroic mirror 12 is disposed on an optical path AX of the light source 11, and has a function of separating the light from the light source 11 into blue light B and light of other colors (red light R and green light G). The dichroic mirror 13 is disposed on the optical path AX of the light source 11, and has a function of separating the light that has passed through the dichroic mirror 12 into red light R and green light G. The total reflection mirror 14 is disposed on an optical path of the light reflected by the dichroic mirror 12, and reflects the blue light B separated by the dichroic mirror 12 toward the polarization beam splitter 17.

The polarization beam splitter 15 is disposed on an optical path of the red light R, and has a function of separating the incident red light R into two polarization components orthogonal to each other on a polarization separation surface 15A. The polarization beam splitter 16 is disposed on an optical path of the green light G, and has a function of separating the incident green light G into two polarization components orthogonal to each other on a polarization separation surface 16A. The polarization beam splitter 17 is disposed on an optical path of the blue light B, and has a function of separating the incident blue light B into two polarization components orthogonal to each other on a polarization separation surface 17A. The polarization separation surfaces 15A, 16A, and 17A reflect one of the polarization components (for example, an S-polarization component) and transmit the other polarization component (for example, a P-polarization component).

The liquid crystal light valves 21R, 21G, and 21B constituting the display device 1 each include a reflective liquid crystal panel and generate image light of the corresponding color by modulating incident light on the basis of an input image signal. Note that the configuration of the liquid crystal light valves 21R, 21G, and 21B will be described later in detail. The liquid crystal light valve 21R is disposed on the optical path of the red light R reflected by the polarization separation surface 15A. The liquid crystal light valve 21R is driven by, for example, a digital signal subjected to pulse-width modulation (PWM) according to a red image signal, and has a function of modulating incident light and reflecting the modulated light toward the polarization beam splitter 15. The liquid crystal light valve 21G is disposed on the optical path of the green light G reflected by the polarization separation surface 16A. The liquid crystal light valve 21G is driven by, for example, a digital signal subjected to pulse-width modulation (PWM) according to a green image signal, and has a function of modulating incident light and reflecting the modulated light toward the polarization beam splitter 16. The liquid crystal light valve 21B is disposed on the optical path of the blue light B reflected by the polarization separation surface 17A. The liquid crystal light valve 21B is driven by, for example, a digital signal subjected to pulse-width modulation (PWM) according to a blue image signal, and has a function of modulating incident light and reflecting the modulated light toward the polarization beam splitter 17.

The combining prism 18 is disposed at a position where the optical paths of the modulated light emitted from the liquid crystal light valves 21R, 21G, and 21B and transmitted through the polarization beam splitters 15,16, and 17 cross one another. The combining prism 18 has a function of combining the modulated light to generate color image light. The projection lens 19 is disposed on an optical path of the image light emitted from combining prism 18, and has a function of projecting the image light emitted from combining prism 18 toward the screen 20.

Figure 2:
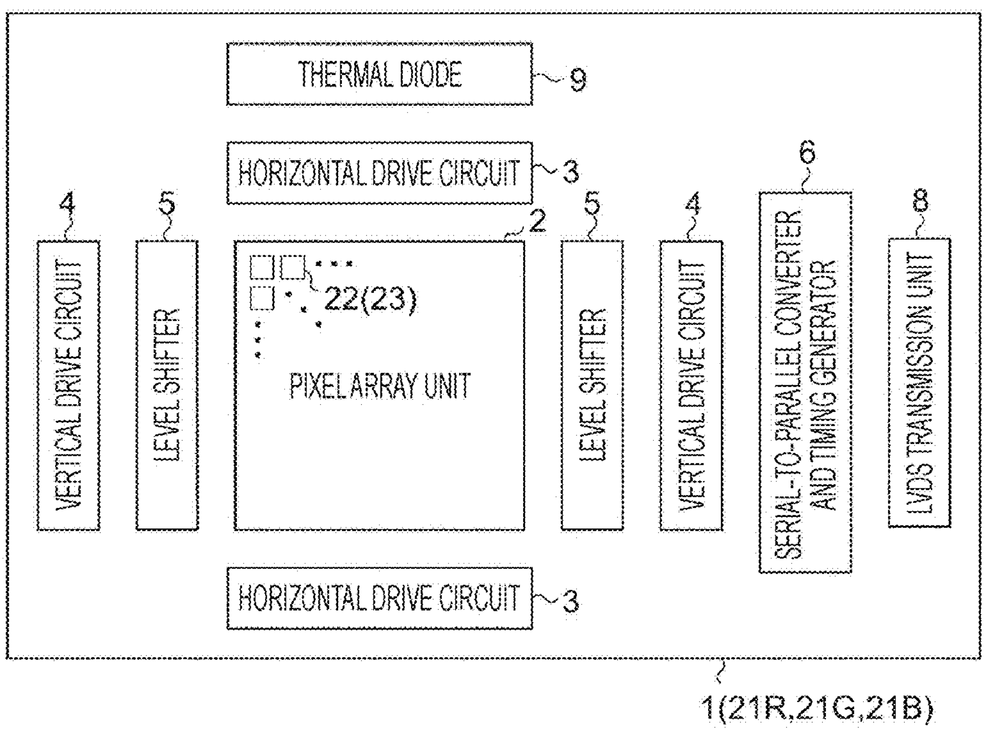
FIG. 2 is a block diagram illustrating a schematic configuration of a liquid crystal light valve of FIG. 1.

FIG. 2 is a block diagram illustrating a schematic configuration of the liquid crystal light valves 21R, 21G, and 21B constituting the display device 1 of FIG. 1. The display device 1 of FIG. 2 includes a pixel array unit 2, a horizontal drive circuit 3, a vertical drive circuit (first drive circuit) 4, a level shifter 5, a serial-to-parallel converter and timing generator 6, a low voltage differential signaling (LVDS) transmission unit 8, and a thermal diode 9.

In the present specification, a left-and-right direction in FIG. 2 will be referred to as a horizontal direction, and an up-and-down direction will be referred to as a vertical direction. The pixel array unit 2 includes a plurality of pixels 22 arranged in the horizontal direction and the vertical direction. Each pixel 22 includes a display element and a pixel circuit 23 that drives the display element. The display element is, for example, a liquid crystal element. A specific circuit configuration of the pixel circuit 23 will be described later. In the pixel array unit 2, signal lines (data lines) extending in the vertical direction are arranged in the horizontal direction at regular intervals, and gate lines (also referred to as scanning lines) extending in the horizontal direction are arranged in the vertical direction at regular intervals. The pixel 22 is disposed at each of intersections between the plurality of signal lines and the plurality of gate lines.

Two horizontal drive circuits 3 are arranged above and below the pixel array unit 2. The two horizontal drive circuits 3 supply pixel data to the plurality of data lines arranged in the horizontal direction at the regular intervals and extending in the vertical direction. Voltage amplitude of the pixel data supplied to the plurality of data lines is equivalent to, for example, voltage amplitude of the logic circuit. The pixel data output from the horizontal drive circuit 3 is thus supplied to the data lines without the level shifter 5 converting the voltage level thereof. As a result, circuit scale of the display device 1 can be reduced.

Two vertical drive circuits 4 and two level shifters 5 are arranged to the left and the right of the pixel array unit 2. The two vertical drive circuits 4 supply gate signals to the plurality of gate lines arranged in the vertical direction at the regular intervals and extending in the vertical direction. Since the voltage amplitude of the gate signals supplied to the plurality of gate lines is larger than the voltage amplitude of the logic circuit, for example, the level shifter 5 converts a voltage level.

The serial-to-parallel converter and timing generator 6 converts pixel data DATA including a serial signal supplied from the LVDS transmission unit 8 into pixel data DATA including a parallel signal, and supplies the pixel data DATA to the two horizontal drive circuits 3. Furthermore, the serial-to-parallel converter and timing generator 6 synchronizes timing at which the pixel data DATA is supplied to the two horizontal drive circuits 3 with timing at which the vertical drive circuits 4 drive each gate line.

The LVDS transmission unit 8 performs serial transmission of pixel data at high speed between the display device 1 and a host device (not illustrated). The thermal diode 9 is provided to measure temperature of the display device 1. The thermal diode 9 measures the temperature by applying a constant current and measuring a voltage.

The display device 1 according to the present embodiment drives each pixel 22 by, for example, a pulse width modulation (PWM) modulation method. In the PWM modulation method, one frame period required to drive all the pixels 22 in a display area of the display device 1 is divided into a plurality of subframe periods, and display periods of the display elements in the subframes are differentiated from one another. By driving each pixel 22 in at least one of the plurality of subframes, a light emission period of the pixel 22 in one frame can be controlled, and gradations are expressed by differences in the light emission period of each pixel 22.

Figure 3:
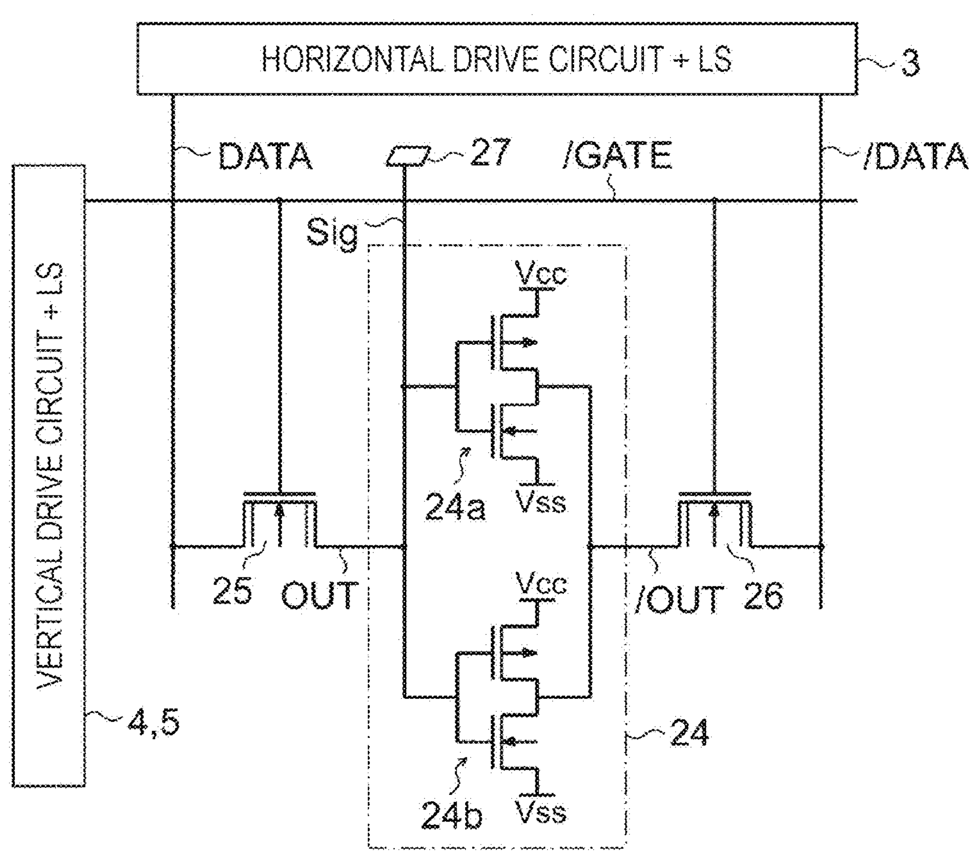
FIG. 3 is a circuit diagram of a pixel circuit according to a comparative example.

In order to drive each pixel 22 by the PWM modulation method, it is necessary to provide a memory in the pixel circuit 23. FIG. 3 is a circuit diagram of a pixel circuit 23 according to a comparative example. The pixel circuit 23 of FIG. 3 includes a memory 24 and two NMOS transistors 25 and 26. The memory 24 has a static random access memory (SRAM) configuration in which, for example, two inverters 24*a* and 24*b* are connected in a ring shape. In each of the inverters 24*a* and 24*b*, a PMOS transistor and an NMOS transistor are cascode-connected between a power supply voltage node and a ground node.

The memory 24 includes two output nodes (hereinafter referred to as a first output node OUT and a second output node/OUT) that output pixel data DATA having different polarities in a complementary manner. Each data line extending from the horizontal drive circuit 3 has a differential configuration. One data line of the differential configuration will be referred to as a first data line DATA and a second data line/DATA hereinafter for convenience. The NMOS transistor 25 is connected between the first output node OUT and the first data line DATA. The NMOS transistor 26 is connected between the second output node/OUT and the second data line/DATA. A gate of the NMOS transistor 25 and a gate of the NMOS transistor 26 are connected to the common gate line/GATE extending from the vertical drive circuit 4.

A signal line Sig is connected to one (for example, the first output node OUT) of the two output nodes included in the memory 24, and the signal line Sig is connected to a pixel electrode 27.

Since a signal having a voltage amplitude larger than the voltage amplitude of the logic circuit is input to a gate or the like of each transistor in the pixel circuit 23 of FIG. 3, it is necessary to achieve the transistor with a medium-voltage or high-voltage transistor. The medium-voltage or high-voltage transistor has a circuit area larger than that of the low-voltage transistor used in the logic circuit, and power consumption also increases.

First Specific Example

Figure 4:
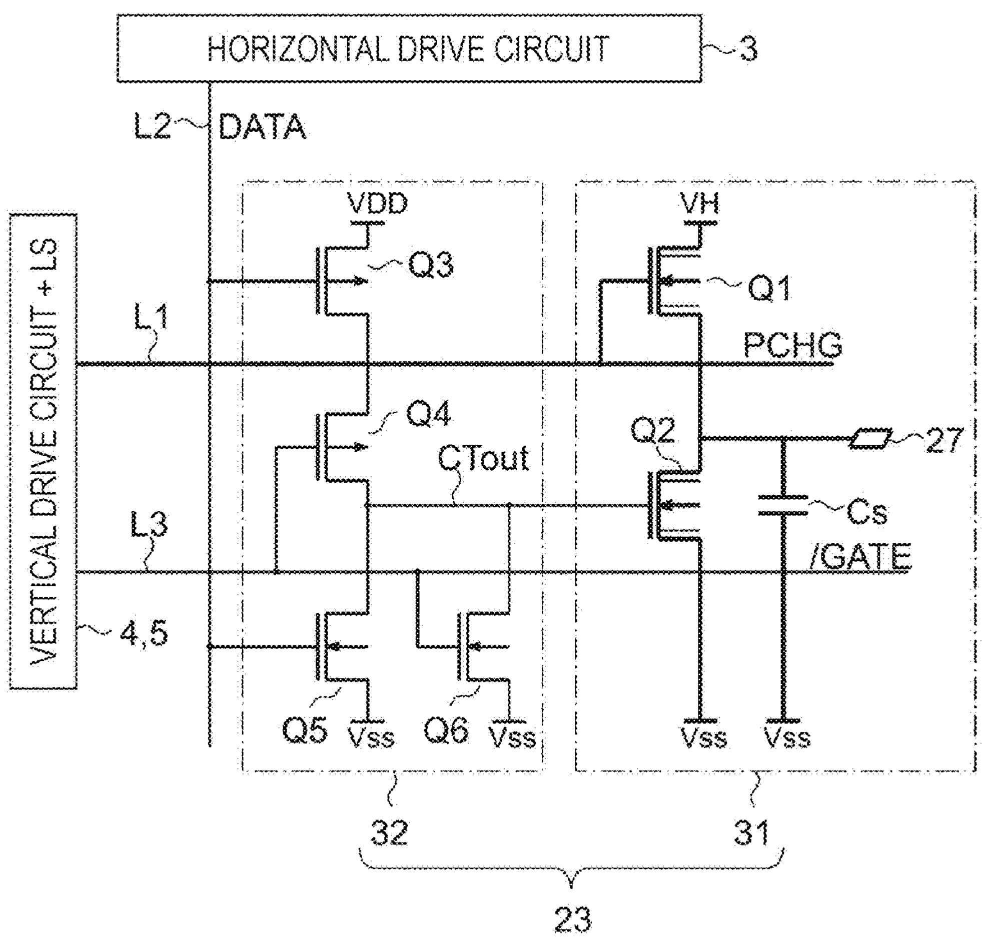
FIG. 4 is a circuit diagram of a pixel circuit according to a first specific example.

FIG. 4 is a circuit diagram of the pixel circuit 23 according to a first specific example. The pixel circuit 23 of FIG. 4 includes a capacitor Cs, a charge/discharge circuit 31, and a control circuit 32.

The capacitor Cs holds a charge corresponding to a voltage supplied to the display element. The display element is, for example, a liquid crystal element, and one end of the capacitor Cs is connected to the pixel electrode 27 that applies a voltage to the liquid crystal element.

The charge/discharge circuit 31 charges and discharges the capacitor Cs. Since a voltage corresponding to the charge of the capacitor Cs is applied to the pixel electrode 27, the charge/discharge circuit 31 will also be referred to as a pixel electrode drive circuit 31 hereinafter. The pixel electrode drive circuit 31 of FIG. 4 includes two medium-voltage or high-voltage NMOS transistors (a first switching element Q1 and a second switching element Q2). In the present specification, the first switching element Q1 will also be referred to as an NMOS transistor Q1, and the second switching element Q2 will also be referred to as an NMOS transistor Q2.

The control circuit 32 controls the pixel electrode drive circuit 31. More specifically, the control circuit 32 generates a control signal for controlling the pixel electrode drive circuit 31. The control circuit 32 of FIG. 4 includes a plurality of low-voltage transistors Q3 to Q6. Since voltage amplitude of each signal input to or output from the control circuit 32 is smaller than voltage amplitude applied to the liquid crystal element and a drive circuit of the liquid crystal element, the control circuit 32 includes a plurality of low-voltage transistors in the pixel circuit 23 of FIG. 4. The control circuit 32 will also be referred to as a logic circuit.

As described above, the pixel circuit 23 of FIG. 4 includes the medium-voltage or high-voltage MOS transistors Q1 and Q2 and the low-voltage MOS transistors Q3 to Q6. As a result, circuit area can be reduced and power consumption can be reduced as compared with a case where all the transistors have medium or high withstand voltages as in the pixel circuit 23 of FIG. 3.

In FIG. 4 and FIGS. 5 to 9, which will be referred to later, thin lines indicate signal paths whose voltage amplitude is close to that of the logic circuit, and thick lines indicate signal paths whose voltage amplitude is larger than that of the logic circuit.

FIG. 4 illustrates an example in which the control circuit 32 performs a NOR operation, but a type of logical operation performed by the control circuit 32 is not limited. The control circuit 32 of FIG. 4 includes the four low-voltage transistors Q3 to Q6, but any number of transistors may be used in the control circuit 32. Furthermore, the control circuit 32 of FIG. 4 includes the two PMOS transistors Q3 and Q4 and the two NMOS transistors Q5 and Q6, but the transistors may be of any conductivity type. Moreover, although FIG. 4 illustrates an example in which the control circuit 32 includes the four MOS transistors Q3 to Q6, the control circuit 32 may include bipolar transistors or Bi-CMOS transistors.

The control circuit 32 includes the two PMOS transistors Q3 and Q4 cascode-connected between a first power supply voltage node VDD and an output node CTout of the control circuit 32, the NMOS transistor Q5 connected between the output node CTout of the control circuit 32 and a ground node Vss, and the NMOS transistor Q6 connected between the output node CTout of the control circuit 32 and the ground node Vss. Pixel data DATA output from the horizontal drive circuit 3 via a data line L2 is input to a gate of the PMOS transistor Q3 and a gate of the NMOS transistor Q5. A gate signal/GATE output from the vertical drive circuit 4 via a gate line L3 is input to a gate of the PMOS transistor and a gate of the NMOS transistor. The gate signal/GATE is a display timing signal.

The control circuit 32 of FIG. 4 generates a control signal by performing a NOR operation of the pixel data DATA output from the horizontal drive circuit 3 via the data line L2 and the gate signal/GATE (more precisely, an inverted signal of the gate signal GATE) output from the vertical drive circuit 4 via the gate line L3. The control circuit 32 outputs a high-level control signal CTout in a case where the pixel data DATA is at a low level and the inverted signal of the gate signal/GATE is at a low level. In a case where the pixel data DATA is at a high level or the inverted signal of the gate signal/GATE is at a high level, a low-level control signal CTout is output.

The pixel electrode drive circuit 31 includes the two medium-voltage or high-voltage NMOS transistors Q1 and Q2. The NMOS transistor Q1 and the NMOS transistor Q2 are cascode-connected between a second power supply voltage node VH and the ground node Vss. The second power supply voltage node VH is a node whose voltage level is higher than that of the first power supply voltage node VDD.

Furthermore, the pixel electrode drive circuit 31 includes the capacitor Cs connected between a connection node (a node connected to the pixel electrode 27) between the NMOS transistor Q1 and the NMOS transistor Q2 and the ground node Vss. The capacitor Cs functions as the memory 24 that stores the pixel data DATA. By configuring the memory 24 with one capacitor Cs, circuit area can be reduced and power consumption can be reduced as compared with the pixel circuit 23 of FIG. 3.

A precharge signal PCHG output from the vertical drive circuit 4 via a precharge signal line L1 is input to a gate of the NMOS transistor Q1. The precharge signal PCHG has a voltage amplitude larger than voltage amplitude of the control circuit 32. More specifically, the precharge signal PCHG has a voltage amplitude of a ground voltage (0 V) and (5 V+Vth). Vth denotes a threshold voltage of the NMOS transistor Q1. In a case where the precharge signal PCHG becomes a high level (5 V+Vth), the NMOS transistor Q1 is turned on, a source of the NMOS transistor Q1 becomes 5 V, and the capacitor Cs is charged with 5 V.

A charging voltage of the capacitor Cs is lower than the high-level voltage of the precharge signal PCHG by the threshold voltage of the NMOS transistor Q1. A voltage level of the precharge signal PCHG needs to be set in consideration of a fact that a voltage at one end of the capacitor Cs is a voltage lower by the threshold voltage of the NMOS transistor Q1.

The control signal CTout output from the control circuit 32 is input to a gate of the NMOS transistor Q2. Voltage amplitude of the control signal CTout is smaller than voltage amplitude of the precharge signal PCHG, but since voltage amplitude of a drain of the NMOS transistor Q2 is larger than the voltage amplitude of the control circuit 32, the NMOS transistor Q2 is a medium-voltage or high-voltage transistor.

As described above, since the pixel electrode drive circuit 31 includes the two medium-voltage or high-voltage NMOS transistors Q1 and Q2, circuit area is larger than that of a configuration including two low-voltage NMOS transistors; however, the circuit area is much smaller than that of a configuration in which all the MOS transistors in the pixel circuit 23 have medium or high withstand voltages as illustrated in FIG. 3, and power consumption can also be reduced.

Furthermore, the pixel circuit 23 of FIG. 4 stores the pixel data DATA in the capacitor Cs instead of the memory 24 of FIG. 3. The memory 24 of FIG. 3 has an SRAM configuration and requires six MOS transistors. The pixel circuit 23 of FIG. 4, on the other hand, can store the pixel data DATA with only one capacitor Cs. In a case where the capacitor Cs is provided instead of the memory 24, however, the control circuit 32 for generating the control signal CTout for controlling the pixel electrode drive circuit 31 is required.

Comparing the pixel circuit 23 of FIG. 3 with the pixel circuit 23 of FIG. 4, the total number of transistors is the same, namely six, but all the six transistors have medium or high withstand voltages in the pixel circuit 23 of FIG. 3, whereas in the pixel circuit 23 of FIG. 4, only two transistors have medium or high withstand voltages, and the other four transistors have low withstand voltages. The pixel circuit 23 of FIG. 4, therefore, requires the capacitor Cs but can be achieved with a circuit area smaller than the circuit area of the pixel circuit 23 of FIG. 3.

In the pixel circuit 23 of FIG. 4, the capacitor Cs is charged to drive the pixel electrode 27 by turning on the NMOS transistor Q1 in the pixel electrode drive circuit 31. A voltage of the pixel electrode 27 is desirably as high as possible, but a voltage lower than the voltage level of the precharge signal PCHG input to the gate of the NMOS transistor Q1 by the threshold voltage of the NMOS transistor Q1 is supplied to one end of the capacitor Cs and the pixel electrode 27. In order to prevent a voltage drop corresponding to the threshold voltage from occurring, therefore, it is necessary to increase the voltage level of the precharge signal PCHG by the threshold voltage.

As described above, the pixel circuit 23 of FIG. 4 can have a circuit area smaller than that of the pixel circuit 23 of FIG. 3. More specifically, in the pixel circuit 23 of FIG. 4, since the pixel electrode drive circuit 31 in which it is difficult to miniaturize a design rule includes two medium-voltage or high-voltage MOS transistors and the control circuit 32 that controls the pixel electrode drive circuit 31 includes low-voltage MOS transistors, the number of medium-voltage or high-voltage transistors can be minimized, and the circuit area can be reduced.

Furthermore, in the pixel circuit 23 of FIG. 4, the conductivity types of the two MOS transistors Q1 and Q2 in the pixel electrode drive circuit 31 are the same. As a result, in a case where the pixel circuit 23 is formed with a bulk structure, it is sufficient to provide a well region of a single conductivity type (for example, a P-well region in the case of an NMOS transistor) in a bulk region, and the circuit area can be further reduced.

Furthermore, the pixel circuit 23 of FIG. 4 does not need the two NMOS transistors 25 and 26 of FIG. 3 that determines whether or not to write the pixel data DATA to the pixel electrode 27. In the pixel circuit 23 of FIG. 4, since the control circuit 32 including low-voltage transistors controls the pixel electrode drive circuit 31, power consumption can be reduced. The control circuit 32 in the pixel circuit 23 of FIG. 4 controls whether or not to obtain the pixel data DATA from the horizontal drive circuit 3, controls whether or not to store the pixel data DATA in the capacitor Cs, and performs a simple level shift.

Furthermore, the pixel circuit 23 of FIG. 4 can lower the voltage amplitude of the pixel data DATA output from the horizontal drive circuit 3 via the data line L2 to the voltage amplitude of the control circuit 32, thereby reducing power consumption. In the pixel circuit 23 of FIG. 3, on the other hand, since the pixel data DATA output from the horizontal drive circuit 3 via the data line L2 is input to the gates of the medium-voltage or middle-voltage and high-voltage transistors Q1 and Q2, it is necessary to increase the voltage amplitude of the pixel data DATA on the data line L2, and the power consumption increases.

As described above, the pixel circuit 23 of FIG. 4 can be configured with a smaller circuit area and lower power consumption than the pixel circuit 23 of FIG. 3.

Second Specific Example

Figure 5:
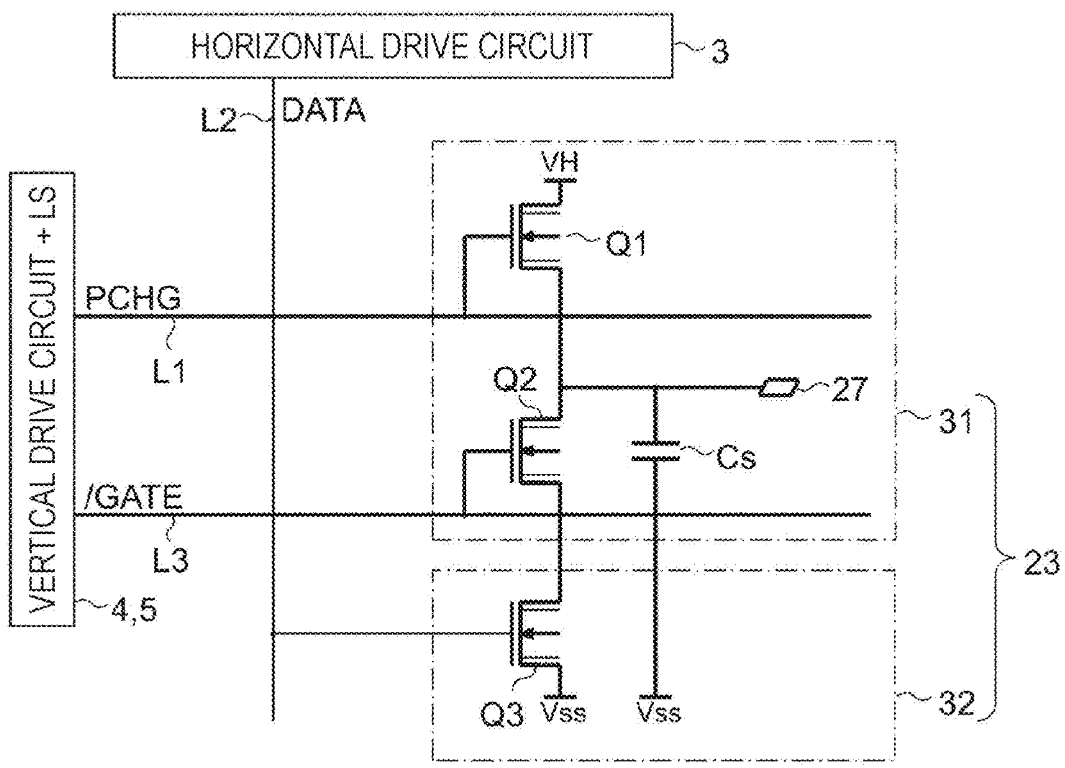
FIG. 5 is a circuit diagram of a pixel circuit according to a second specific example.

FIG. 5 is a circuit diagram of a pixel circuit 23 according to a second specific example. In the pixel circuit 23 of FIG. 5, the configuration of the control circuit 32 is simplified as compared with the pixel circuit 23 of FIG. 4. The pixel circuit 23 of FIG. 5 includes three medium-voltage or high-voltage NMOS transistors Q1 to Q3 and the capacitor Cs. These three NMOS transistors Q1 to Q3 are cascode-connected between the second power supply voltage node VH and the ground node Vss. The precharge signal PCHG output from the vertical drive circuit 4 is input to a gate of the NMOS transistor Q1. Among the NMOS transistors Q1 to Q3, the NMOS transistor Q1 and the NMOS transistor Q2 constitute a charge/discharge circuit 31 (pixel electrode drive circuit 31), and the NMOS transistor Q3 constitutes a control circuit 32. The NMOS transistor Q3 also functions as the charge/discharge circuit 31.

The precharge signal PCHG is set to a voltage level higher than the charge voltage of the capacitor Cs by the threshold voltage of the NMOS transistor Q1.

The control circuit 32 in the pixel circuit 23 of FIG. 4 includes the low-voltage MOS transistors Q3 to Q6, but the control circuit 32 in the pixel circuit 23 of FIG. 5 includes the medium-voltage or high-voltage MOS transistor Q3.

The capacitor Cs is connected between a connection node between the NMOS transistor Q1 and the NMOS transistor Q2 (a node connected to the pixel electrode 27) and the ground node Vss. That is, the capacitor Cs is connected between a drain of the NMOS transistor Q2 and the ground node Vss. The capacitor Cs holds a charge corresponding to the pixel data DATA. That is, the capacitor Cs is used to store the pixel data DATA.

The gate signal/GATE output from the vertical drive circuit 4 via the gate line L3 is input to a gate of the NMOS transistor Q2. The pixel data DATA output from the horizontal drive circuit 3 via the data line L2 is input to a gate of the NMOS transistor Q3.

In the pixel circuit 23 of FIG. 4, the voltage amplitude of the gate signal/GATE output from the vertical drive circuit 4 is small, but in the pixel circuit 23 of FIG. 5, the voltage amplitude of the gate signal/GATE output from the vertical drive circuit 4 is made larger than a logic circuit level. This is because the drain of the NMOS transistor Q2 is connected to the pixel electrode 27 and the voltage level is high.

In the pixel circuit 23 of FIG. 5, on the other hand, as with the pixel circuit 23 of FIG. 4, the voltage amplitude of the pixel data DATA output from the horizontal drive circuit 3 via the data line L2 is set to a small amplitude. The pixel data DATA is input to the gate of the NMOS transistor Q1. Since voltage amplitude of a drain of the NMOS transistor Q1 is large, the NMOS transistor Q1 is a medium-voltage or high-voltage transistor.

As described above, since the pixel circuit 23 of FIG. 5 includes only the three medium-voltage or high-voltage MOS transistors Q1 to Q3 and the capacitor Cs, circuit area can be reduced as compared with the pixel circuit 23 in FIG. 4. Since the voltage amplitude of the precharge signal PCHG and the gate signal/GATE output from the vertical drive circuit 4 are larger than the voltage amplitude of the control circuit 32, the power consumption of the vertical drive circuit 4 of FIG. 5 is larger than that of the vertical drive circuit 4 of FIG. 4.

Since all the three transistors Q1 to Q3 in the pixel circuit 23 of FIG. 5 have the same conductivity type, only a P-well region needs to be provided in the bulk structure, and the circuit area can be further reduced.

Third Specific Example

Figure 6:
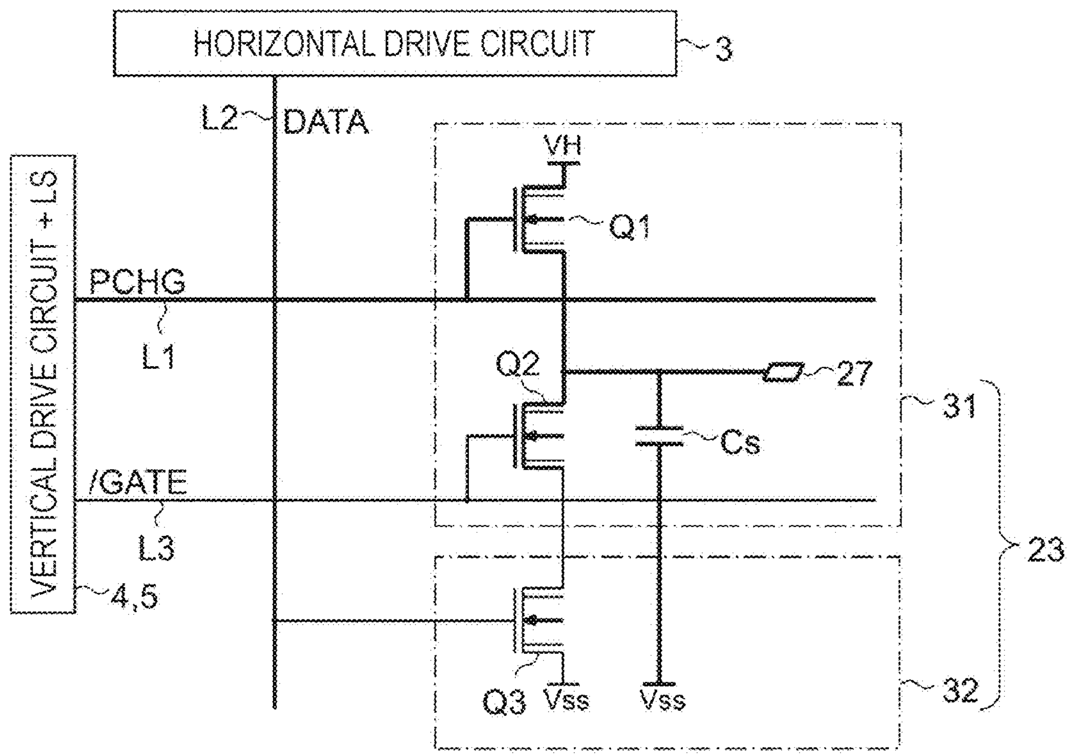
FIG. 6 is a circuit diagram of a pixel circuit according to a third specific example.

FIG. 6 is a circuit diagram of a pixel circuit 23 according to a third specific example. The pixel circuit 23 of FIG. 6 includes a charge/discharge circuit 31 (pixel electrode drive circuit 31) and a control circuit 32. The control circuit 32 includes a low-voltage NMOS transistor Q3. The pixel electrode drive circuit 31 includes two medium-voltage or high-voltage NMOS transistors (an NMOS transistor Q1 and an NMOS transistor Q2) and a capacitor Cs.

The first, second, and third NMOS transistors Q1 to Q3 are cascode-connected between the second power supply voltage node VH and the ground node Vss.

The pixel circuit 23 of FIG. 6 is different in that the NMOS transistor Q1 in the pixel circuit 23 of FIG. 5 has a low withstand voltage, but has the same circuit configuration.

Furthermore, the voltage amplitude of the gate signal/GATE from the vertical drive circuit 4 input to the gate of the NMOS transistor Q2 in the pixel circuit 23 of FIG. 6 is approximately the same as the voltage amplitude of the control circuit 32. More specifically, the high level of the gate signal/GATE is a voltage level higher than a high level voltage of the control circuit 32 by the threshold voltage of the NMOS transistor Q2.

In the pixel circuit 23 of FIG. 6, the voltage amplitude of the gate signal/GATE input to the gate of the NMOS transistor Q2 is set to the voltage level of the control circuit 32, so that the NMOS transistor Q1 can be a low-voltage MOS transistor.

Since the pixel circuit 23 of FIG. 6 includes the two medium-voltage or high-voltage transistors Q1 and Q2, the one low-voltage transistor Q3, and the capacitor Cs, the circuit area can be further reduced as compared with the pixel circuit 23 in FIG. 5.

Furthermore, since the pixel circuit 23 of FIG. 6 includes the three transistors Q1 to Q3 of the same conductivity type as with the pixel circuit 23 of FIG. 5, it is sufficient to provide only a P-well region in the bulk structure, and the circuit area can be further reduced.

Fourth Specific Example

In the pixel circuits 23 according to the first to third specific examples, since a voltage lower, by a threshold voltage, than the voltage level of the precharge signal PCHG input to the gates of the MOS transistors Q1 and Q2 in the pixel electrode drive circuit 31 used to charge the capacitor Cs is supplied to one end of the capacitor Cs and the pixel electrode 27, it cannot be said that voltage efficiency is good. A pixel circuit 23 according to a fourth specific example described below is configured such that a voltage at the same voltage level as the precharge signal PCHG is supplied to one end of the capacitor Cs and the pixel electrode 27.

Figure 7:
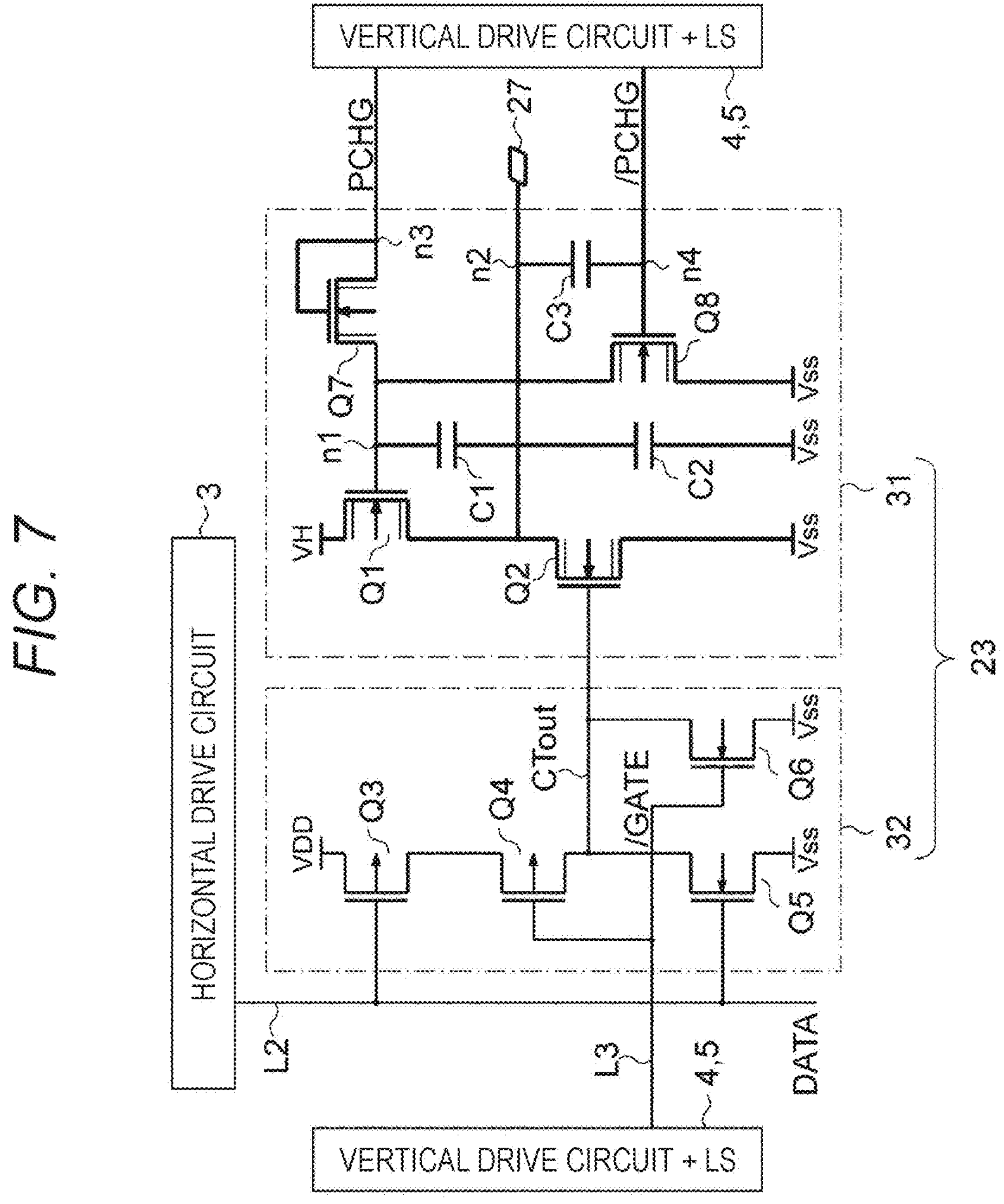
FIG. 7 is a circuit diagram of a pixel circuit according to a fourth specific example.

FIG. 7 is a circuit diagram of the pixel circuit 23 according to the fourth specific example. The pixel circuit 23 of FIG. 7 includes a control circuit 32 and a pixel electrode drive circuit 31.

The control circuit 32 of FIG. 7 has a circuit configuration similar to that of the control circuit 32 of FIG. 4. More specifically, the control circuit 32 in FIG. 7 includes four low-voltage MOS transistors Q3 to Q6. Even more specifically, the control circuit 32 of FIG. 7 includes two PMOS transistors (a PMOS transistor Q3 and a PMOS transistor Q4) and two NMOS transistors Q5 and Q6. These four low-voltage MOS transistors Q3 to Q6 constitute, for example, a NOR circuit.

The PMOS transistor Q3, the PMOS transistor Q4, and the NMOS transistor Q5 are cascode-connected between a first power supply voltage node VDD and a ground node Vss. A drain of the NMOS transistor Q5 and a drain of the NMOS transistor Q6 are connected to an output node CTout of the control circuit 32. A source of the NMOS transistor Q5 and a source of the NMOS transistor Q6 are connected to the ground node Vss.

Pixel data DATA is input to a gate of the PMOS transistor Q3 and a gate of the NMOS transistor Q5. A gate signal/

GATE is input to a gate of the PMOS transistor Q4 and a gate of the NMOS transistor Q6.

The pixel electrode drive circuit 31 of FIG. 7 includes four medium-voltage or high-voltage NMOS transistors Q1, Q2, Q7, and Q8 and three capacitors (first to third capacitors) C1 to C3. The second capacitor C2 functions as a capacitor Cs that holds a charge corresponding to a voltage applied to the pixel electrode 27. Among these, the first capacitor C1, the third capacitor C3, and the NMOS transistor Q8 constitute a compensation circuit 33. The compensation circuit 33 compensates for a decrease in a charging voltage of the second capacitor C2 caused in a case where the precharge signal PCHG is input to the gate of the NMOS transistor Q1 via a diode or the diode-connected NMOS transistor Q7.

The NMOS transistor Q1 and the NMOS transistor Q2 are cascode-connected between a second power supply voltage node VH and the ground node Vss. A control signal CTout output from the control circuit 32 is input to the gate of the NMOS transistor Q2.

The diode-connected NMOS transistor Q7 is connected to the gate of the NMOS transistor Q1. The precharge signal PCHG from the vertical drive circuit 4 is input to a gate and a source of the NMOS transistor Q7. The NMOS transistor Q8 is connected between the gate of the NMOS transistor Q1 and the ground node Vss.

The first capacitor C1 and the second capacitor C2 are connected in series between the gate of the NMOS transistor Q1 and the ground node Vss. One end of the second capacitor C2 is connected to the pixel electrode 27. The third capacitor C3 is connected between one end of the second capacitor C2 and a gate of the NMOS transistor Q8.

The gate of the NMOS transistor Q1 will be referred to as a first node n1, the one end of the second capacitor C2 will be referred to as a second node n2, the gate and the source of the NMOS transistor Q7 will be referred to as a third node n3, and the gate of the NMOS transistor Q8 will be referred to as a fourth node n4 hereinafter.

The diode-connected NMOS transistor Q7 is connected to the first node n1. Therefore, in a case where a voltage of the first node n1 is higher than a voltage of the precharge signal PCHG, the first node n1 and the third node n3 can be electrically separated from each other, and a voltage level of the first node n1 can be set higher than a voltage level of the precharge signal PCHG.

When the precharge signal PCHG becomes a high level, the NMOS transistor Q1 is turned on, and a charge corresponding to a threshold voltage of the NMOS transistor Q1 is held in the first capacitor C1. The second capacitor C2, therefore, holds a charge corresponding to a voltage lower than the voltage level of the precharge signal PCHG by the threshold voltage.

An inverted signal of the precharge signal PCHG is input to the gate of the NMOS transistor Q8. In a case where the precharge signal PCHG is at the high level, therefore, the gate of the NMOS transistor Q8 is at a ground level, and a charge similar to that of the second capacitor C2 is held.

In a case where the precharge signal PCHG becomes a low level, the NMOS transistor Q1 is turned off. Since an inverted signal of the precharge signal PCHG is input to the gate of the NMOS transistor Q8, the gate of the NMOS transistor Q8 is set to a high level. A voltage level at the second node n2, therefore, becomes high, and the voltage applied to the pixel electrode 27 becomes a voltage level substantially equal to the high level of the precharge signal PCHG.

As described above, in the fourth specific example, in order to compensate for application of a voltage lower than the high level of the precharge signal PCHG by the threshold voltage of the NMOS transistor Q1 to the pixel electrode 27, a voltage substantially the same as the high level of the precharge signal PCHG can be applied to the pixel electrode 27 by a circuit having a boot slap configuration including the first capacitor C1, the third capacitor C3, the diode-connected NMOS transistor Q7, and the NMOS transistor Q8.

In the first to third specific examples, in order to apply a voltage at the same level as the power supply voltage to the pixel electrode 27, it is necessary to make the high level of the precharge signal PCHG higher than the power supply voltage by the threshold voltage of the MOS transistor, and it is necessary to generate a precharge signal PCHG having a voltage level higher than the power supply voltage. In the pixel circuit 23 according to the fourth specific example, on the other hand, even if the high level of the precharge signal PCHG is set to the same level as the power supply voltage, a voltage at the same level as the power supply voltage can be applied to the pixel electrode 27, and it is not necessary to generate the precharge signal PCHG at a voltage level higher than the power supply voltage. The circuit configuration of the vertical drive circuit 4 can thus be simplified.

Fifth Specific Example

Figure 8:
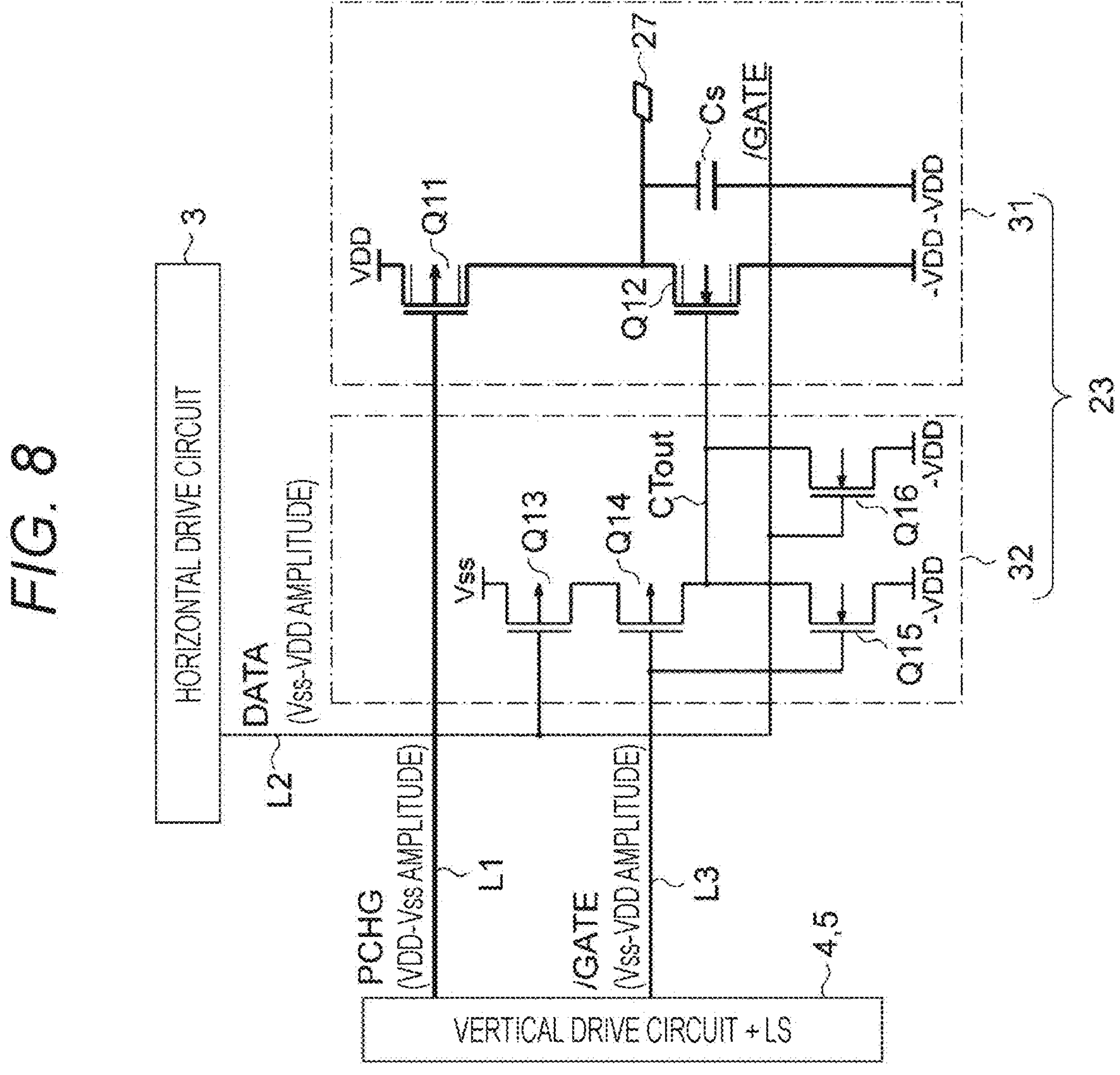
FIG. 8 is a circuit diagram of a pixel circuit according to a fifth specific example.

FIG. 8 is a circuit diagram of a pixel circuit 23 according to a fifth specific example. The pixel circuit 23 of FIG. 8 includes a control circuit 32 and a charge/discharge circuit (pixel electrode drive circuit) 31.

The pixel circuit 23 of FIG. 8 is obtained by replacing the ground node Vss of the pixel circuit 23 of FIG. 4 with a negative power supply voltage node (−VDD). That is, the positive power supply voltage node VDD and the negative power supply voltage node (−VDD) are connected to the control circuit 32 and the pixel electrode drive circuit 31 in the pixel circuit 23 of FIG. 8.

The pixel electrode drive circuit 31 includes a PMOS transistor Q11 and an NMOS transistor Q12 cascode-connected between the positive power supply voltage node VDD and the negative power supply voltage node (−VDD), and a capacitor Cs.

A precharge signal PCHG having a voltage amplitude of the positive power supply voltage VDD and the ground voltage Vss is input to a gate of the PMOS transistor Q11. A control signal CTout output from the control circuit 32 is input to a gate of the NMOS transistor Q12. The precharge signal PCHG is input from the vertical drive circuit 4.

In a case where the precharge signal PCHG decreases to the ground voltage Vss, the PMOS transistor Q11 is turned on, and the capacitor Cs is charged. The capacitor Cs holds a charge corresponding to a voltage twice the power supply voltage VDD. In a case where the control signal CTout reaches the ground voltage, which is a high level, the NMOS transistor Q12 is turned on, and the accumulated charge in the capacitor Cs is discharged.

The control circuit 32 includes two PMOS transistors Q13 and Q14 and two NMOS transistors Q15 and Q16 constituting a NOR circuit. A ground node Vss is connected to a source of the PMOS transistor Q13. A source of the NMOS transistor Q15 and a source of the NMOS transistor Q16 are connected to the negative power supply voltage node (−VDD).

The pixel data DATA from the horizontal drive circuit 3 and the gate signal/GATE from the vertical drive circuit 4 are input to the control circuit 32. The pixel data DATA has a voltage amplitude of the ground voltage Vss and the negative power supply voltage (−VDD). The gate signal/GATE has a voltage amplitude of the ground voltage Vss and the negative power supply voltage (−VDD).

As described above, in the pixel circuit 23 of FIG. 8, a charge corresponding to a voltage twice the power supply voltage can be held in the capacitor Cs using the positive power supply voltage VDD and the negative power supply voltage (−VDD), and a problem that a voltage lower than a voltage level of the precharge signal PCHG is applied to the pixel electrode 27 does not occur.

Sixth Specific Example

Figure 9:
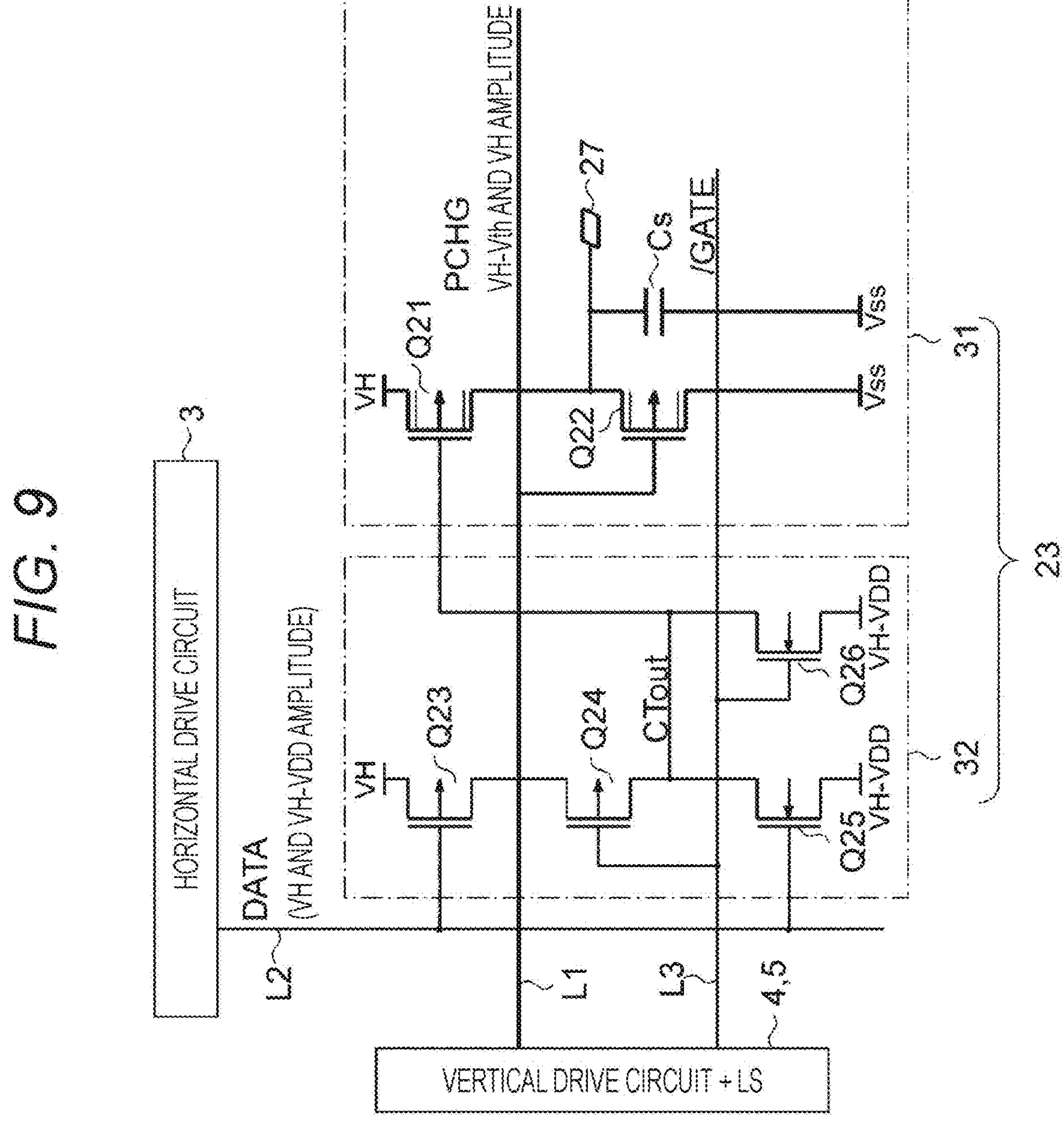
FIG. 9 is a circuit diagram of a pixel circuit according to a sixth specific example.

FIG. 9 is a circuit diagram of a pixel circuit 23 according to a sixth specific example. In the pixel circuit 23 of FIG. 9, the conductivity types of the two MOS transistors constituting the charge/discharge circuit (pixel electrode drive circuit) 31 in the pixel circuit 23 of FIG. 4 are reversed.

The pixel circuit 23 of FIG. 9 includes a pixel electrode drive circuit 31 and a control circuit 32.

The pixel electrode drive circuit 31 of FIG. 9 includes two PMOS transistors Q21 and Q22. A source of the PMOS transistor Q21 is connected to a power supply voltage VH node, and a control signal CTout from the control circuit 32 is input to a gate of the PMOS transistor Q21. A source of the PMOS transistor Q22 is connected to a drain of the PMOS transistor Q21, and a precharge signal PCHG is input to a gate of the PMOS transistor Q22. A drain of the PMOS transistor Q22 is connected to a ground node Vss. The capacitor Cs is connected between the source of the PMOS transistor Q22 and the ground node Vss.

The control circuit 32 includes two PMOS transistors Q23 and Q24 and two NMOS transistors Q25 and Q26 constituting a NOR circuit.

A source of the PMOS transistor Q23 is connected to the power supply node VH, and pixel data DATA is input to a gate of the PMOS transistor Q23. The pixel data DATA has a voltage amplitude of VH and VH−VDD.

A source of the PMOS transistor Q24 is connected to a drain of the PMOS transistor Q23, and a gate signal/GATE is input to a gate of the PMOS transistor Q24.

A drain of the NMOS transistor Q25 is connected to a drain of the PMOS transistor Q24 (an output node CTout of the control circuit 32), and the pixel data DATA is input to a gate of the NMOS transistor Q25. A drain of the NMOS transistor Q26 is connected to the output node CTout of the control circuit 32, and the gate signal/GATE is input to a gate of the NMOS transistor Q26. A source of the NMOS transistor Q25 and a source of the NMOS transistor Q26 are connected to a power supply voltage (VH−VDD) node. As a result, the voltage amplitude of the control signal CTout output from the control circuit 32 becomes VH and VH−VDD.

As described above, in the pixel circuit 23 of FIG. 9, the PMOS transistor Q21 is turned on in a case where the control signal CTout output from the control circuit 32 is VH−VDD, and the capacitor Cs holds a charge corresponding to the power supply voltage VH. Furthermore, in a case where the precharge signal PCHG is VH-Vth, the PMOS transistor Q22 is turned on, and the accumulated charge in the capacitor Cs is discharged.

The pixel circuits 23 according to the first to fifth specific examples described above include the charge/discharge circuit 31, the control circuit 32, and the capacitor Cs as a common circuit configuration. The charge/discharge circuit 31 charges and discharges the capacitor Cs. The control circuit 32 controls the charge/discharge circuit 31. The charge/discharge circuit 31 includes a first switching element Q1 that controls charging of the capacitor Cs and a second switching element Q2 that controls discharging of the capacitor Cs. The control circuit 32 includes a third switching element Q3 that controls on or off of at least one of the first switching element Q1 and the second switching element Q2 on the basis of at least one of the pixel data DATA and the display timing signal.

The first switching element Q1 is, for example, the NMOS transistor Q1 of FIG. 4. The second switching element Q2 is, for example, the NMOS transistor Q2 of FIG. 4. The third switching element is, for example, the NMOS transistors Q3 to Q6 in FIG. 4.

Since the pixel circuit 23 according to the first to fifth specific examples includes high-voltage transistors and low-voltage transistors, the circuit area can be reduced and the power consumption can be reduced as compared with a case where the pixel circuit 23 includes only high-voltage transistors. Furthermore, by making the conductivity types of the first switching element Q1 and the second switching element Q2 in the charge/discharge circuit (pixel electrode drive circuit) 31 the same, it is sufficient to provide only a well region of a single polarity in the case of a bulk structure, and it is possible to further reduce the circuit area.

Each transistor in the pixel circuits 23 according to the first to fifth specific examples may be a MOS transistor or a bipolar transistor.

Application Examples of Display Device 1 and Electronic Apparatus in Present Disclosure

First Application Example

Figure 10A:
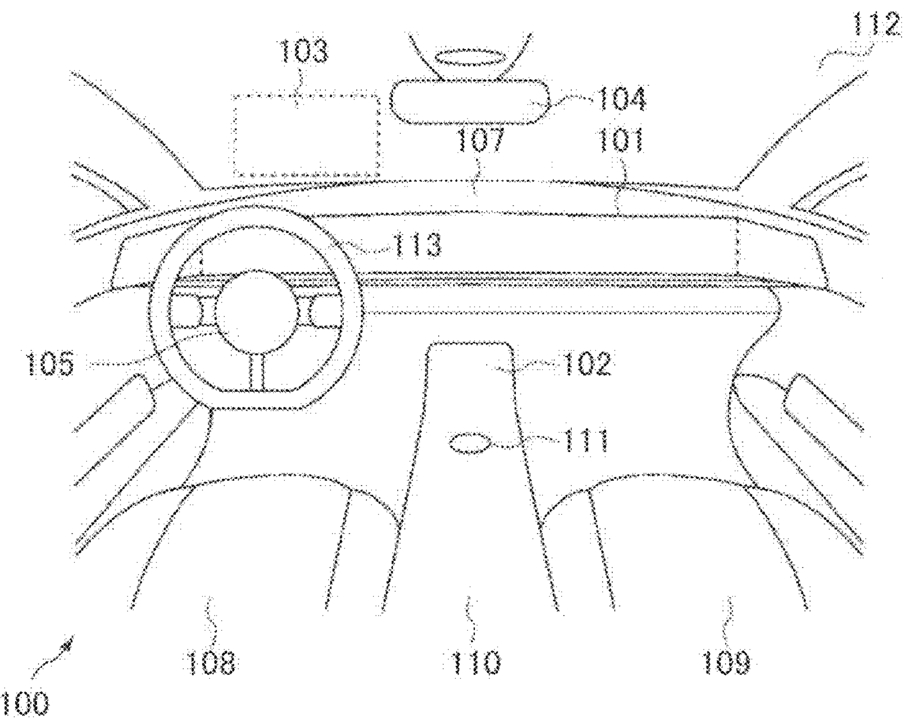
FIG. 10A is a diagram illustrating an internal state of a vehicle from a rear side to a front side of the vehicle.
Figure 10B:
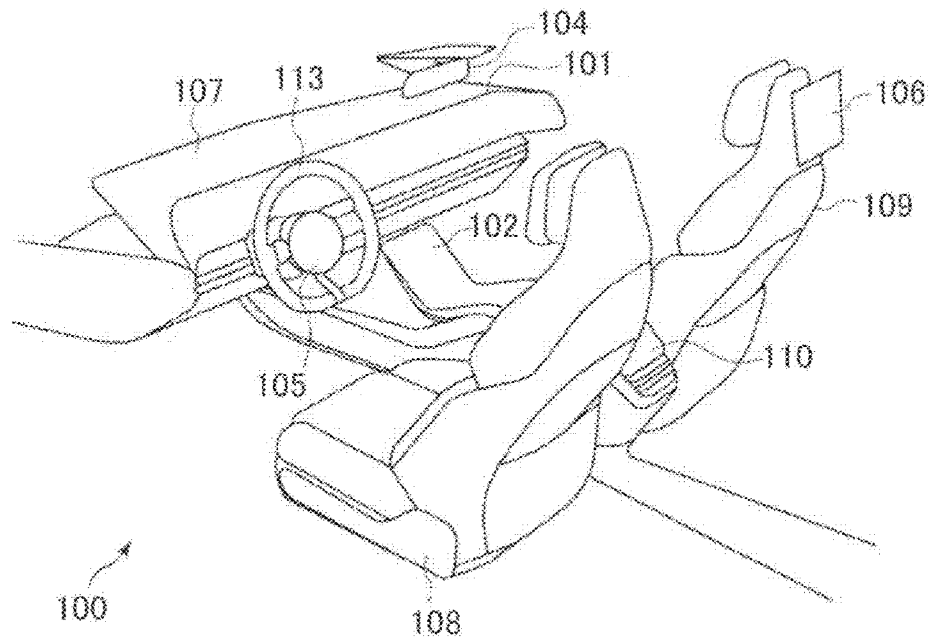
FIG. 10B is a diagram illustrating an internal state of the vehicle from an oblique rear side to an oblique front side of the vehicle.

The display device 1 and the electronic apparatus 50 in the present disclosure can be used for various purposes. FIGS. 10A and 10B are diagrams illustrating an internal configuration of a vehicle 100 as a first application example of an electronic apparatus 50 including the display device 1 in the present disclosure. FIG. 10A is a diagram illustrating an internal state of the vehicle 100 as viewed from a rear side to a front side of the vehicle 100, and FIG. 10B is a diagram illustrating an internal state of the vehicle 100 as viewed from an oblique rear side to an oblique front side of the vehicle 100.

The vehicle 100 in FIGS. 10A and 10B includes a center display 101, a console display 102, a head-up display 103, a digital rear mirror 104, a steering wheel display 105, and a rear entertainment display 106.

The center display 101 is arranged on a dashboard 107 at a location facing a driver seat 108 and a passenger seat 109. FIG. 10 illustrates an example of the center display 101 having a horizontally long shape extending from the driver seat 108 side to the passenger seat 109 side, but any screen size and arrangement location of the center display 101 may be adopted. The center display 101 can display information sensed by the various sensors. As a specific example, the center display 101 can display a captured image captured by an image sensor, an image of a distance to an obstacle in front of or on a side of the vehicle, the distance being measured by a ToF sensor, a passenger's body temperature detected by an infrared sensor, and the like. The center display 101 can be used to display, for example, at least one of safety-related information, operation-related information, lifelogs, health-related information, authentication/identification-related information, and entertainment-related information.

The safety-related information is information regarding doze sensing, looking-away sensing, sensing of mischief of a child riding together, presence or absence of wearing of a seat belt, sensing of an occupant being left behind, and the like, and is information sensed by the sensor on a back surface side of the center display 101, for example. The operation-related information senses a gesture related to an operation by an occupant by using the sensor. The sensed gestures may include an operation of various types of equipment in the vehicle 100. For example, operations of air conditioning equipment, a navigation device, an audiovisual (AV) device, a lighting device, and the like are detected. The lifelogs include lifelogs of all occupants. For example, the lifelogs includes an action record of each occupant in the vehicle. By acquiring and storing the lifelogs, it is possible to check states of the occupants at a time of an accident. In the health-related information, a health condition of an occupant is estimated on the basis of body temperature of the occupant detected by a temperature sensor. Alternatively, an image of an occupant's face may be captured by an image sensor, and a health condition of the occupant may be estimated from a facial expression in the captured image. Furthermore, a conversation may be made with an occupant using automatic voice, and a health condition of the occupant may be estimated on the basis of how the occupant has responded. The authentication/identification-related information includes a keyless entry function of performing face authentication using a sensor, a function of automatically adjusting height and a position of a seat through face identification, and the like. The entertainment-related information includes a function of detecting, with a sensor, operation information regarding an AV device being used by an occupant, a function of recognizing the occupant's face with sensor and providing content suitable for the occupant through the AV device, and the like.

The console display 102 can be used, for example, to display lifelog information. The console display 102 is disposed near a shift lever 111 of a center console 110 between the driver seat 108 and the passenger seat 109. The console display 102 can also display information sensed by the various sensors. Furthermore, the console display 102 may display an image of the surroundings of the vehicle captured by an image sensor, or may display an image of a distance to an obstacle present in the surroundings of the vehicle.

The head-up display 103 is virtually displayed behind a windshield 112 in front of the driver seat 108. The head-up display 103 can be used to display, for example, at least one of the safety-related information, the operation-related information, the lifelogs, the health-related information, the authentication/identification-related information, and the entertainment-related information. Since the head-up display 103 is virtually arranged in front of the driver seat 108 in many cases, the head-up display 103 is suitable for displaying information directly related to an operation of the vehicle 100, such as a speed of the vehicle 100 and a remaining amount of fuel (battery).

The digital rear mirror 104 can display a state of occupants in a rear seat in addition to the rear side of the vehicle 100, and thus can be used to display the lifelog information, for example, by disposing the sensor on a back surface side of the digital rear mirror 104.

The steering wheel display 105 is arranged near the center of a steering wheel 113 of the vehicle 100. The steering wheel display 105 can be used to display, for example, at least one of the safety-related information, the operation-related information, the lifelogs, the health-related information, the authentication/identification-related information, and the entertainment-related information. In particular, since the steering wheel display 105 is close to the driver's hands, the steering wheel display 105 is suitable for displaying the lifelog information such as body temperature of the driver and information regarding operations performed on the AV device, air conditioning equipment, or the like.

The rear entertainment display 106 is attached to a back side of the driver seat 108 or the passenger seat 109, and is for occupants in the rear seat to watch. The rear entertainment display 106 can be used to display, for example, at least one of the safety-related information, the operation-related information, the lifelogs, the health-related information, the authentication/identification-related information, and the entertainment-related information. In particular, since the rear entertainment display 106 is in front of the occupants in the rear seat, information related to the occupants in the rear seat is displayed. For example, information regarding operations performed on the AV device or the air conditioning equipment may be displayed, or a result of measurement of body temperatures or the like of occupants in the rear seat with a temperature sensor may be displayed.

As described above, disposing a sensor on the back surface side of the display device 1 makes it possible to measure the distance to an object existing in the surroundings. Optical distance measurement methods are roughly classified into a passive type and an active type. By a method of the passive type, distance measurement is performed by receiving light from an object, without projecting light from a sensor to the object. Methods of the passive type include a lens focus method, a stereo method, and a monocular vision method. Methods of the active type include distance measurement that is performed by projecting light onto an object, and receiving reflected light from the object with a sensor to measure the distance. Methods of the active type include an optical radar method, an active stereo method, an illuminance difference stereo method, a moire topography method, and an interference method. The display device 1 according to the present disclosure can be used in distance measurement by any of these methods. With a sensor disposed on the back surface side of the display device 1 according to the present disclosure in an overlapping manner, distance measurement of the passive type or the active type described above can be performed.

Second Application Example

The display device 1 according to the present disclosure is applicable not only to various displays used in conveyances but also to displays mounted on various electronic apparatuses 50.

Figure 11A:
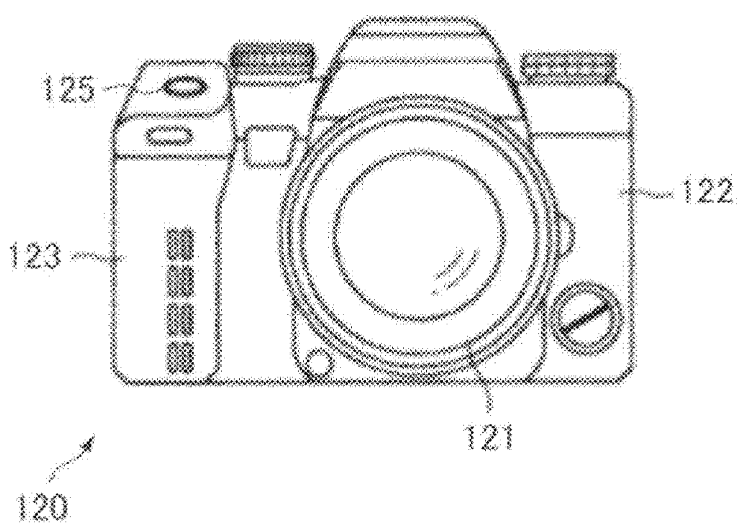
FIG. 11A is a front view of a digital camera as a second application example of an electronic apparatus.
Figure 11B:
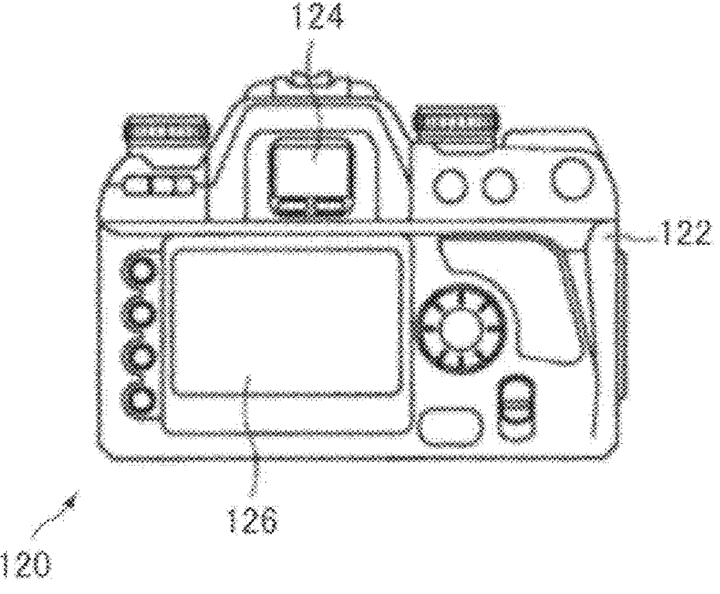
FIG. 11B is a rear view of the digital camera.

FIG. 11A is a front view of a digital camera 120 as a second application example of the electronic apparatus 50, and FIG. 11B is a rear view of the digital camera 120. The digital camera 120 in FIGS. 11A and 11B is an example of a single-lens reflex camera in which a lens 121 is replaceable, but the electronic apparatus 50 is also applicable to a camera in which the lens 121 is not replaceable.

In the camera in FIGS. 11A and 11B, when a person who captures an image looks into an electronic viewfinder 124 to determine a composition while holding a grip 123 of a camera body 122, and presses a shutter 125 while adjusting focus, captured image data is stored in a memory in the camera. As illustrated in FIG. 11B, on a back side of the camera, a monitor screen 126 that displays the captured image data and the like and a live image and the like, and the electronic viewfinder 124 are provided. Furthermore, there is a case where a sub screen that displays setting information such as a shutter speed and an exposure value is provided on the upper surface of the camera.

By disposing a sensor, in an overlapping manner, on the back surface side of the monitor screen 126, the electronic viewfinder 124, the sub screen, and the like that are used for the camera, the camera can be used as the display device 1 according to the present disclosure.

Third Application Example

The display device 1 according to the present disclosure is also applicable to a head-mounted display (hereinafter, referred to as an HMD). The HMD can be used for virtual reality (VR), augmented reality (AR), mixed reality (MR), substitutional reality (SR), or the like.

Figure 12A:
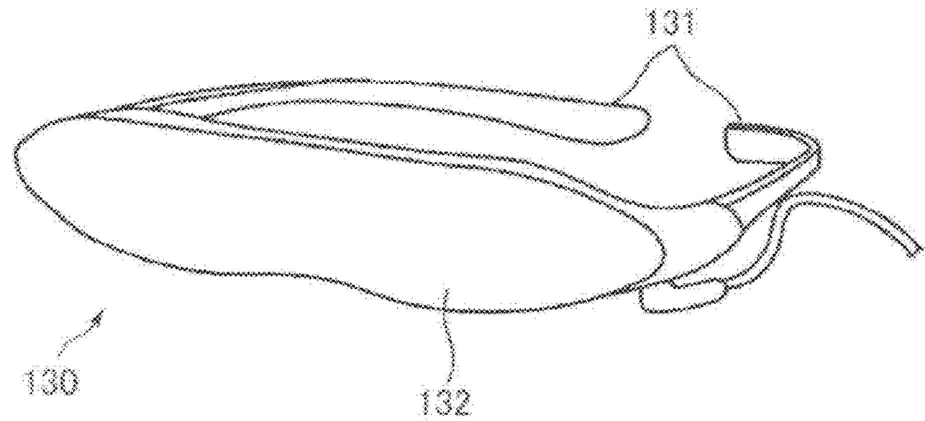
FIG. 12A is an external view of an HMD as a third application example of the electronic apparatus.

FIG. 12A is an external view of an HMD 130 as a third application example of the electronic apparatus 50. The HMD 130 in FIG. 12A includes a mounting member 131 for attachment to cover human eyes. The mounting member 131 is, for example, hooked and fixed to human ears. A display device 132 is provided inside the HMD 130, and a wearer of the HMD 130 can visually recognize a stereoscopic image and the like with the display device 132. The HMD 130 includes, for example, a wireless communication function and an acceleration sensor, and can switch a stereoscopic image and the like displayed on the display device 132 in accordance with a posture, a gesture, and the like of the wearer.

Furthermore, a camera may be provided in the HMD 130 to capture an image around the wearer, and an image obtained by combining the image captured by the camera and an image generated by a computer may be displayed on the display device 132. For example, by arranging the camera to overlap with the back surface side of the display device 132 visually recognized by the wearer of the HMD 130, capturing an image of the surroundings of the eyes of the wearer with the camera, and displaying the captured image on another display provided on the outer surface of the HMD 130, a person around the wearer can obtain expression of the face and a movement of the eyes of the wearer in real time.

Figure 12B:
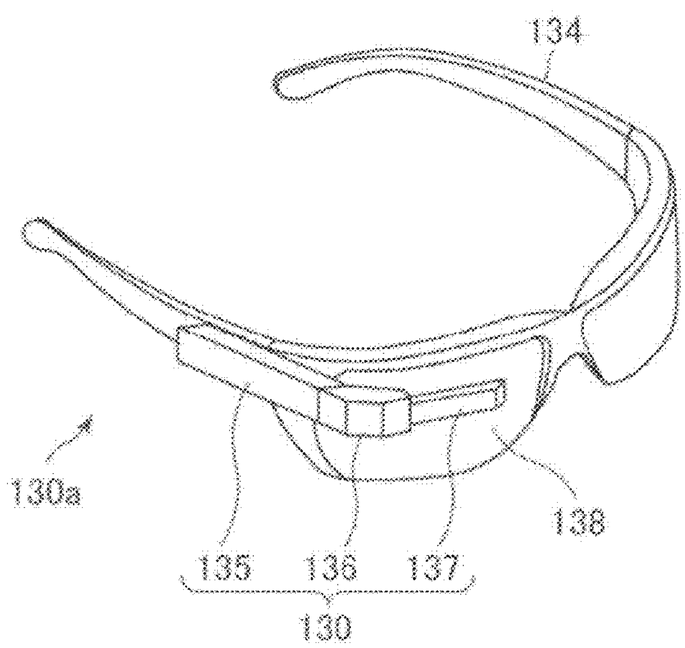
FIG. 12B is an external view of smart glasses.

Note that various types of the HMD 130 are conceivable. For example, as illustrated in FIG. 12B, the display device 1 according to the present disclosure can also be applied to smart glasses **130*a* that display various types of information on glasses 134. The smart glasses 130*a* in FIG. 12B includes a main body portion 135, an arm portion 136, and a lens barrel portion 137. The main body portion 135 is connected to the arm portion 136. The main body portion 135 is detachable from the glasses 134. The main body portion 135 incorporates a display unit and a control board for controlling the operation of the smart glasses 130*a*. The main body portion 135 and the lens barrel portion 137 are connected to each other via the arm portion 136. The lens barrel portion 137 emits image light emitted from the main body portion 135 through the arm portion 136, toward a lens 138 of the glasses 134. This image light enters the human eyes through the lens 138. The wearer of the smart glasses 130*a* in FIG. 12B can visually recognize not only a surrounding situation but also various pieces of information emitted from the lens barrel portion 137** similarly to normal glasses.

Fourth Application Example

The display device 1 according to the present disclosure can also be applied to a television device (hereinafter referred to as a TV). In recent TVs, a frame tends to be as small as possible from the viewpoint of downsizing and design property. Therefore, in a case where a camera to capture an image of a viewer is provided on a TV, it is desirable to arrange the camera so as to overlap with a back surface side of the display panel of the TV.

Figure 13:
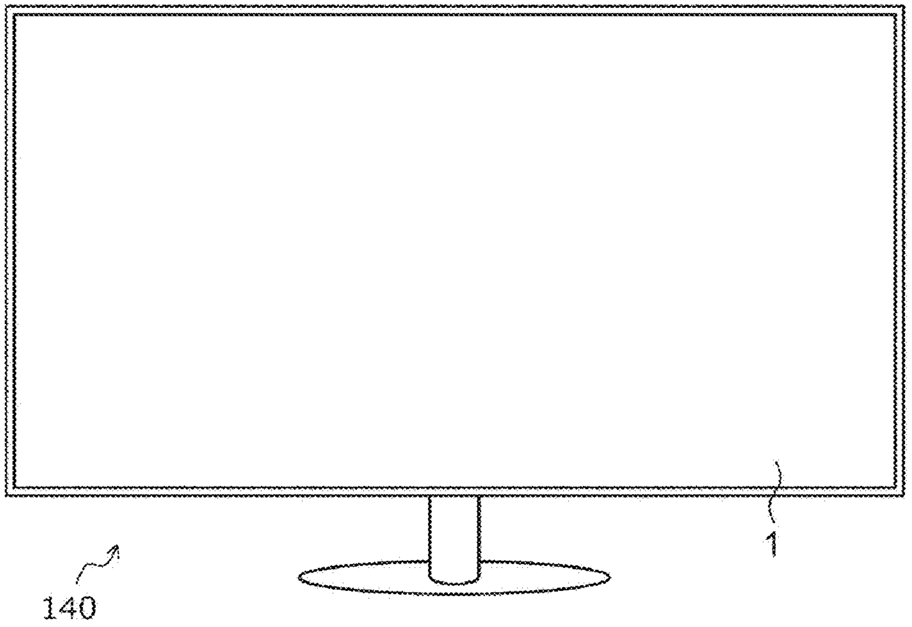
FIG. 13 is an external view of a TV as a fourth application example of the electronic apparatus.

FIG. 13 is an external view of a TV 140 as a fourth application example of the electronic apparatus 50. In the TV 140 in FIG. 13, the frame is minimized, and almost the entire region on the front side is a display area. The TV 140 may incorporate a sensor such as a camera to capture the image of the viewer.

Fifth Application Example

Figure 14:
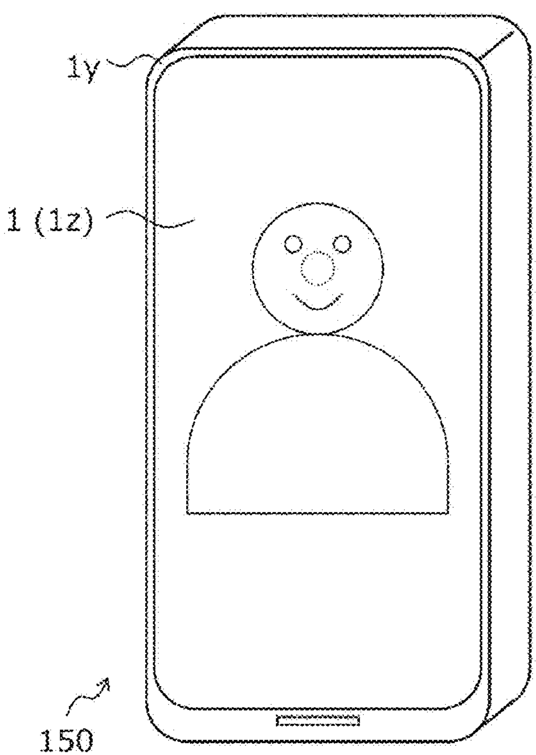
FIG. 14 is an external view of a smartphone as a fifth application example of the electronic apparatus.

The display device 1 according to the present disclosure can also be applied to a smartphone and a mobile phone. FIG. 14 is an external view of a smartphone 150 as a fifth application example of the electronic apparatus 50. In an example in FIG. 14, a display surface **1*z* extends to nearly the outer shape of the electronic apparatus 50, and the width of a bezel 1*y* around the display surface 1*z* is set to several millimeters or less. Usually, a front camera is mounted on the bezel 1*y* in many cases, but an image sensor module functioning as a front camera may be disposed on, for example, a back surface side of the display surface 1*z* at a substantially central portion. As described above, by providing the front camera on the back surface side of the display surface 1*z* in this manner, the front camera no longer need to be arranged on the bezel 1*y*, and thus the width of the bezel 1*y*** can be narrowed.

Note that the present technology may have the following configurations.

(1) A display device including:

a plurality of pixels, in which the pixels each include a display element and a pixel circuit that controls a voltage supplied to the display element, the pixel circuit includes a capacitor that holds a charge according to the voltage supplied to the display element, a charge/discharge circuit that charges and discharges the capacitor, and a control circuit that controls the charge/discharge circuit, the charge/discharge circuit includes a first switching element that controls charging of the capacitor and a second switching element that controls discharging of the capacitor, and the control circuit includes a third switching element that controls on or off of at least one of the first switching element and the second switching element on the basis of at least one of pixel data or a display timing signal.

(2) The display device according to (1), in which the first switching element and the second switching element withstand a same voltage and have a same conductivity type.

(3) The display device according to (1) or (2), in which the first switching element and the second switching element in the charge/discharge circuit have a first withstand voltage, and the third switching element in the control circuit has a second withstand voltage, which is lower than the first withstand voltage.

(4) The display device according to (1) or (2), in which the first switching element, the second switching element, and the third switching element are cascode-connected between a first reference voltage node and a second reference voltage node, and the capacitor is connected between a connection node between the first switching element and the second switching element and the second reference voltage node.

(5) The display device according to (4), in which the third switching element has a same withstand voltage and a same conductivity type as the first switching element and the second switching element.

(6) The display device according to (4), in which the third switching element has a different withstand voltage from and a same conductivity type as those of the first switching element and the second switching element.

(7) The display device according to any one of (1) to (3), in which the first switching element and the second switching element are cascode-connected between a first reference voltage node and a second reference voltage node, and the capacitor is connected between a connection node between the first switching element and the second switching element and the second reference voltage node.

(8) The display device according to any one of (1) to (7), in which the control circuit generates a control signal to be input to a gate of at least one of the first switching element and the second switching element on the basis of the pixel data and the display timing signal.

(9) The display device according to (8), in which a precharge signal is input to one of gates of the first switching element and the second switching element, and the control signal is input to another gate.

(10) The display device according to (9), in which a voltage amplitude of the precharge signal is larger than a voltage amplitude of the control signal.

(11) The display device according to (9) or (10), in which a voltage amplitude of the precharge signal is larger than voltage amplitudes of the pixel data and the display timing signal.

(12) The display device according to any one of (9) to (11), further including:

a first drive circuit that sets a voltage level of the precharge signal in consideration of a threshold voltage of the first switching element or the second switching element.

(13) The display device according to (12), in which the first switching element and the second switching element are N-type metal oxide semiconductor (MOS) transistors, a drain of the first switching element is connected to a first reference voltage node, one end of the capacitor is connected to a source of the first switching element, and the first drive circuit sets the voltage level of the precharge signal to a voltage higher than a voltage of the first reference voltage node by the threshold voltage so that the source of the first switching element has a same voltage level as the first reference voltage node when the capacitor is charged.

(14) The display device according to (12), in which the first switching element and the second switching element are P-type metal oxide semiconductor (MOS) transistors, a source of the first switching element is connected to a first reference voltage node, a drain of the second switching element is connected to a second reference voltage node, one end of the capacitor is connected to a drain of the first switching element, and the first drive circuit sets the voltage level of the precharge signal to a voltage lower than a voltage of the second reference voltage node by the threshold voltage so that the drain of the first switching element has a same voltage level as the second reference voltage node when the capacitor is discharged.

(15) The display device according to any one of (12) to (14), in which the first drive circuit inputs the precharge signal having a voltage amplitude larger than a voltage amplitude of the control circuit and the display timing signal having a voltage amplitude close to the voltage amplitude of the control circuit to the control circuit.

(16) The display device according to any one of (9) to (11), in which the charge/discharge circuit includes a diode or a diode-connected transistor connected to the gate of the first switching element, and a compensation circuit that compensates for a decrease in a charging voltage of the capacitor caused in a case where the precharge signal is input to the gate of the first switching element via the diode or the diode-connected transistor.

(17) The display device according to (1) or (3), in which a first reference voltage of a first reference voltage node and a second reference voltage of a second reference voltage node have opposite voltage polarities, and a precharge signal supplied to a gate of the first switching element and the display timing signal have opposite voltage polarities.

(18) The display device according to (17), in which the precharge signal supplied to the gate of the first switching element and the pixel data have opposite voltage polarities, and the control circuit is supplied with the first reference voltage or the second reference voltage and an intermediate voltage between the first reference voltage and the second reference voltage.

(19) The display device according to (16) or (17), in which the first switching element and the second switching element have a same withstand voltage and different conductivity types.

Aspects of the present disclosure are not limited to the above-described individual embodiments, but include various modifications that can be conceived by those skilled in the art, and the effects of the present disclosure are not limited to the above-described contents. That is, various additions, modifications, and partial deletions are possible without departing from the conceptual idea and spirit of the present disclosure derived from the matters defined in the claims and equivalents thereof.

REFERENCE SIGNS LIST

1 Display Device
1*y* Bezel
1*z* Display surface
2 Pixel array unit
3 Horizontal drive circuit
4 Vertical drive circuit

5 Level shifter
6 Timing generator
8 LVDS transmission unit
9 Thermal diode
10 Display system
11 Light source
12 Dichroic mirror
13 Dichroic mirror
14 Total reflection mirror
15 Polarization beam splitter
16 Polarization beam splitter
17 Polarization beam splitter
18 Combining prism
19 Projection lens
20 Screen
21B Liquid crystal light valve
21G Liquid crystal light valve
21R Liquid crystal light valve
22 Pixel
23 Pixel circuit
24 Memory
24*a* Inverter
24*b* Inverter
25 NMOS transistor
26 NMOS transistor
27 Pixel electrode
31 Charge/discharge circuit (pixel electrode drive circuit)
32 Control circuit
33 Compensation circuit
50 Electronic apparatus
100 Vehicle
101 Center display
102 Console display
103 Head-up display
104 Digital rear mirror
105 Steering wheel display
106 Rear entertainment display
107 Dashboard
108 Driver seat
109 Passenger seat
110 Center console
111 Shift lever
112 Windshield
113 Steering wheel
120 Digital camera
121 Lens
122 Camera body
123 Grip
124 Electronic viewfinder
125 Shutter
126 Monitor screen
130*a* Smart glasses
131 Mounting member
132 DISPLAY DEVICE
134 Glasses
135 Main body portion
136 Arm portion
137 Lens barrel portion
138 Lens
150 Smartphone

What is claimed is:

1. A display device, comprising:

a plurality of pixels, wherein the pixels each include a display element and a pixel circuit that controls a voltage supplied to the display element, the pixel circuit includes a capacitor that holds a charge according to the voltage supplied to the display element, a charge/discharge circuit that charges and discharges the capacitor, and a control circuit that controls the charge/discharge circuit, the charge/discharge circuit includes a first switching element that controls charging of the capacitor and a second switching element that controls discharging of the capacitor, and the control circuit includes a third switching element that controls on or off of at least one of the first switching element and the second switching element on a basis of at least one of pixel data or a display timing signal, wherein the first switching element and the second switching element have a same withstand voltage and a same conductivity type.

2. The display device according to claim 1, wherein the first switching element and the second switching element in the charge/discharge circuit have a first withstand voltage, and the third switching element in the control circuit has a second withstand voltage, which is lower than the first withstand voltage.

3. The display device according to claim 1, wherein the first switching element and the second switching element are cascode-connected between a first reference voltage node and a second reference voltage node, and the capacitor is connected between a connection node between the first switching element and the second switching element and the second reference voltage node.

4. The display device according to claim 1, wherein the control circuit generates a control signal to be input to a gate of at least one of the first switching element and the second switching element on a basis of the pixel data and the display timing signal.

5. The display device according to claim 4, wherein a precharge signal is input to one of gates of the first switching element and the second switching element, and the control signal is input to another gate.

6. The display device according to claim 5, wherein a voltage amplitude of the precharge signal is larger than a voltage amplitude of the control signal.

7. The display device according to claim 5, wherein a voltage amplitude of the precharge signal is larger than voltage amplitudes of the pixel data and the display timing signal.

8. The display device according to claim 5, further comprising:

a first drive circuit that sets a voltage level of the precharge signal in consideration of a threshold voltage of the first switching element or the second switching element.

9. The display device according to claim 8, wherein the first switching element and the second switching element are N-type metal oxide semiconductor (MOS) transistors, a drain of the first switching element is connected to a first reference voltage node, one end of the capacitor is connected to a source of the first switching element, and the first drive circuit sets the voltage level of the precharge signal to a voltage higher than a voltage of the first reference voltage node by the threshold voltage so that the source of the first switching element has a same voltage level as the first reference voltage node when the capacitor is charged.

10. The display device according to claim 8, wherein the first switching element and the second switching element are P-type metal oxide semiconductor (MOS) transistors, a source of the first switching element is connected to a first reference voltage node, a drain of the second switching element is connected to a second reference voltage node, one end of the capacitor is connected to a drain of the first switching element, and the first drive circuit sets the voltage level of the precharge signal to a voltage lower than a voltage of the second reference voltage node by the threshold voltage so that the drain of the first switching element has a same voltage level as the second reference voltage node when the capacitor is discharged.

11. The display device according to claim 8, wherein the first drive circuit inputs the precharge signal having a voltage amplitude larger than a voltage amplitude of the control circuit and the display timing signal having a voltage amplitude close to the voltage amplitude of the control circuit to the control circuit.

12. The display device according to claim 5, wherein the charge/discharge circuit includes a diode or a diode-connected transistor connected to the gate of the first switching element, and a compensation circuit that compensates for a decrease in a charging voltage of the capacitor caused in a case where the precharge signal is input to the gate of the first switching element via the diode or the diode-connected transistor.

13. The display device according to claim 12, wherein the first switching element and the second switching element have a same withstand voltage and different conductivity types.

14. The display device according to claim 1, wherein a first reference voltage of a first reference voltage node and a second reference voltage of a second reference voltage node have opposite voltage polarities, and a precharge signal supplied to a gate of the first switching element and the display timing signal have opposite voltage polarities.

15. The display device according to claim 14, wherein the precharge signal supplied to the gate of the first switching element and the pixel data have opposite voltage polarities, and the control circuit is supplied with the first reference voltage or the second reference voltage and an intermediate voltage between the first reference voltage and the second reference voltage.

16. A display device, comprising:

a plurality of pixels, wherein the pixels each include a display element and a pixel circuit that controls a voltage supplied to the display element, the pixel circuit includes a capacitor that holds a charge according to the voltage supplied to the display element, a charge/discharge circuit that charges and discharges the capacitor, and a control circuit that controls the charge/discharge circuit, the charge/discharge circuit includes a first switching element that controls charging of the capacitor and a second switching element that controls discharging of the capacitor, and the control circuit includes a third switching element that controls on or off of at least one of the first switching element and the second switching element on a basis of at least one of pixel data or a display timing signal, wherein the first switching element, the second switching element, and the third switching element are cascode-connected between a first reference voltage node and a second reference voltage node, and wherein the capacitor is connected between a connection node between the first switching element and the second switching element and the second reference voltage node.

17. The display device according to claim 16, wherein the first switching element and the second switching element have a same withstand voltage and a same conductivity type.

18. The display device according to claim 16, wherein the third switching element has a same withstand voltage and a same conductivity type as the first switching element and the second switching element.

19. The display device according to claim 16, wherein the third switching element has a different withstand voltage from and a same conductivity type as those of the first switching element and the second switching element.

20. A display device, comprising:

a plurality of pixels, wherein the pixels each include a display element and a pixel circuit that controls a voltage supplied to the display element, the pixel circuit includes a capacitor that holds a charge according to the voltage supplied to the display element, a charge/discharge circuit that charges and discharges the capacitor, and a control circuit that controls the charge/discharge circuit, the charge/discharge circuit includes a first switching element that controls charging of the capacitor and a second switching element that controls discharging of the capacitor, the control circuit includes a third switching element that controls on or off of at least one of the first switching element and the second switching element on a basis of at least one of pixel data or a display timing signal, wherein the control circuit generates a control signal to be input to a gate of at least one of the first switching element and the second switching element on a basis of the pixel data and the display timing signal, wherein a precharge signal is input to one of gates of the first switching element and the second switching element, and the control signal is input to another gate; and a first drive circuit that sets a voltage level of the precharge signal in consideration of a threshold voltage of the first switching element or the second switching element, wherein one of:

(1) the first switching element and the second switching element are N-type metal oxide semiconductor (MOS) transistors, a drain of the first switching element is connected to a first reference voltage node, one end of the capacitor is connected to a source of the first switching element, and the first drive circuit sets the voltage level of the precharge signal to a voltage higher than a voltage of the first reference voltage node by the threshold voltage so that the source of the first switching element has a same voltage level as the first reference voltage node when the capacitor is charged; or (2) the first switching element and the second switching element are P-type metal oxide semiconductor (MOS) transistors, a source of the first switching element is connected to a first reference voltage node, a drain of the second switching element is connected to a second reference voltage node, one end of the capacitor is connected to a drain of the first switching element, and the first drive circuit sets the voltage level of the precharge signal to a voltage lower than a voltage of the second reference voltage node by the threshold voltage so that the drain of the first switching element has a same voltage level as the second reference voltage node when the capacitor is discharged.

* * * * *